(12) United States Patent  (10) Patent No.: US 9,392,054 B1
Biberman et al.  (45) Date of Patent: Jul. 12, 2016

(54) DISTRIBUTED CLOUD COMPUTING PLATFORM AND CONTENT DELIVERY NETWORK

(71) Applicant: Jisto Inc., Cambridge, MA (US)

(72) Inventors: Aleksandr Biberman, Cambridge, MA (US); Andrey Turovsky, Wynantskill, NY (US); Brad Cordova, Brookline, MA (US)

(73) Assignee: Jisto Inc., Cambridge, MA (US)

( * ) Notice: Subject to any disclaimer, the term of this patent is extended or adjusted under 35 U.S.C. 154(b) by 0 days.

(21) Appl. No.: 14/290,245

(22) Filed: May 29, 2014

Related U.S. Application Data

(60) Provisional application No. 61/832,196, filed on Jun. 7, 2013, provisional application No. 61/829,574, filed on May 31, 2013.

(51) Int. Cl.
*G06F 15/173* (2006.01)
*H04L 29/08* (2006.01)
*G06F 9/50* (2006.01)
*G06F 9/46* (2006.01)

(52) U.S. Cl.
CPC .............. *H04L 67/1036* (2013.01); *G06F 9/46* (2013.01); *G06F 9/50* (2013.01)

(58) Field of Classification Search
CPC ..... H04L 63/10; H04L 67/104; H04L 67/108; G06Q 10/06; G06Q 30/0214; G06F 9/465; G06F 9/485; G06F 9/505; G06F 9/5027; G06F 11/3636

USPC .......... 709/204, 226, 201, 224; 718/102, 105, 718/107; 717/154; 705/1.1, 7.12, 30, 80; 707/709

See application file for complete search history.

(56) References Cited

U.S. PATENT DOCUMENTS

| | | | |
|---|---|---|---|
| 6,757,730 B1 * | 6/2004 | Lee et al. ....................... 709/226 |
| 7,167,894 B1 * | 1/2007 | Boudnik ................. G06F 9/465 |
| | | | 709/201 |
| 8,156,223 B2 | 4/2012 | Teodosiu et al. |
| 8,169,916 B1 | 5/2012 | Pai et al. |
| 8,244,559 B2 * | 8/2012 | Horvitz ................. G06F 9/5027 |
| | | | 705/30 |
| 2003/0204602 A1 | 10/2003 | Hudson et al. |
| 2005/0091373 A1 * | 4/2005 | Ciapala ............... G06F 11/3636 |
| | | | 709/224 |
| 2005/0240916 A1 * | 10/2005 | Sandrew ....................... 717/154 |
| 2009/0210882 A1 * | 8/2009 | Srivastava ............... G06F 9/485 |
| | | | 718/107 |
| 2009/0234917 A1 * | 9/2009 | Despotovic et al. .......... 709/204 |
| 2011/0071841 A1 * | 3/2011 | Fomenko et al. .............. 705/1.1 |
| 2011/0125849 A1 * | 5/2011 | Boyd et al. .................... 709/204 |
| 2011/0282793 A1 * | 11/2011 | Mercuri ............. G06Q 30/0214 |
| | | | 705/80 |
| 2011/0313801 A1 * | 12/2011 | Biewald et al. .............. 705/7.12 |
| 2012/0109927 A1 * | 5/2012 | Prasad .......................... 707/709 |
| 2013/0024901 A1 | 1/2013 | Sharif-Ahmadi et al. |

(Continued)

OTHER PUBLICATIONS

U.S. Appl. No. 14/312,985, Distributed Cloud Computing Platform and Content Delivery Network, filed Jun. 24, 2014.

*Primary Examiner* — Dustin Nguyen

(74) *Attorney, Agent, or Firm* — Goodwin Procter LLP

(57) ABSTRACT

Various embodiments of the invention provide methods and systems for providing a distributed computing platform. Tasks for execution are received from a remote computer and a set of computation users are identified to execute the set of computation task segments. The tasks are distributed to the set of computation users a solution segment is received from each computation user in the set of computation users to generate a set of solution segments, which are combined into a solution.

19 Claims, 18 Drawing Sheets

(56) References Cited

U.S. PATENT DOCUMENTS

| | | |
|---|---|---|
| 2013/0046883 A1 | 2/2013 | Lientz et al. |
| 2013/0232430 A1 | 9/2013 | Reitan |
| 2014/0109095 A1* | 4/2014 | Farkash et al. .............. 718/102 |
| 2014/0115037 A1 | 4/2014 | Liu et al. |
| 2014/0181142 A1 | 6/2014 | Issa |
| 2014/0237482 A1* | 8/2014 | Garvey ............... G06F 9/505 718/105 |
| 2014/0258366 A1 | 9/2014 | L'Heureux et al. |

* cited by examiner

DISTRIBUTED CLOUD COMPUTING PLATFORM AND CONTENT DELIVERY NETWORK

CROSS-REFERENCE TO RELATED APPLICATIONS

This application claims priority to and the benefit of U.S. provisional patent application Ser. No. 61/829,574, entitled "Content Delivery Network (CDN) Using Distributed Website Technology", filed on May 31, 2013 and U.S. provisional patent application Ser. No. 61/832,196, entitled "Massively Scalable Distributed Cloud Computing Platform" filed on Jun. 7, 2013, the entire contents both of which are incorporated herein by reference.

FIELD OF THE INVENTION

Various embodiments of the invention relate generally to distributed computation and processing, and, more particularly, to methods and systems that utilize a cloud-based content delivery network to manage distributed processing tasks.

BACKGROUND OF THE INVENTION

The global online population has reached over 2 billion users, or about 30% of the world's population. The average Internet user spends about 16 hours on the Internet every month, while that figure doubles for users in the United States. This equates to approximately 35 billion hours of online user time—an equivalent to almost 4 million years aggregated every month.

For most people, browsing the Internet is not a computationally-intensive activity, and considering the constantly-evolving hardware profile of an average user, the processing potential of their hardware is generally underutilized. This leaves many idle computation cycles that can be harnessed for constructive purposes.

In addition, there are people, entities, and organizations that benefit heavily from distributed computing. For example, some users run high-performance computing applications that perform computationally-intensive tasks in fields such as quantum mechanics, weather forecasting, climate research, oil and gas exploration, molecular modeling, and physical simulations. Other users deal with big data applications, with data sets so large and complex, they are impossible to process using conventional processing techniques. For these applications, users need to capture, curate, store, search, share, transfer, analyze, and visualize data. They also need to find correlations in data for business trends, determine research quality, prevent diseases, link legal citations, combat crime, and determine real-time roadway traffic conditions. Still other users use distributed computing to perform rendering animation, cryptography searches, bioinformatics, face recognition, climate models, genetic algorithms, and many more applications.

Most of the users of distributed computations have a choice to either build on-premises data centers, or use private and public cloud computing services such as Amazon Web Services (AWS). These solutions require physical data centers to perform the computations, independent of whether they are on-premises systems, or in the cloud on the premises of third parties. Most data centers run at maximum capacity, at any demand, wasting about 90% of the electricity that is pulled off the grid. Combined with underutilization, the energy wasted in these data centers is about thirty times the amount used for actual computation. Worldwide, data centers use about 30 GW of electricity, roughly equivalent to 30 nuclear power plants. Thus, the costs associated with these solutions are dominated by administration, and raise the price of the associated distributed computing services.

Another element of the online infrastructure that has helped ease the delivery and distribution of information is content delivery networks ("CDNs"). CDNs serve content to end-users with the goal of high availability and high performance. They serve many different types of content for a large fraction of the Internet, including web objects (text, graphics and scripts), downloadable objects (media files, software, and documents), applications (e-commerce and portals), live streaming media, on-demand streaming media, and social networks. CDN nodes are usually geographically diversified, often over multiple backbones. These services help to reduce bandwidth costs, improve page load times, or increase global availability of content. The number of nodes and servers making up a CDN varies, depending on the architecture. Some may reach thousands of nodes with tens of thousands of servers on many remote points of presence (PoPs).

SUMMARY OF THE INVENTION

Various aspects of the invention described herein provide methods and supporting processing platform that harness the computing potential of Internet usage which, in turn, provides users a powerful distributed cloud computing environment delivered as an on-demand service. Specifically, website visitors who are visiting designated websites may automatically become part of this framework and automatically contribute their idle computation cycles. Unlike prior systems, this approach can be configured to reside entirely inside the website and web browser, and does not require any downloading and/or installation of applications or browser plug-ins. Furthermore, this framework does not require any manual interaction with these website visitors. There is no need for physical data centers to perform the computations—all the computations are performed by website visitors. Because of the data center requirement reduction, this distributed computing framework is more energy efficient and at a lower cost than conventional solutions.

With this framework, users who desire distributed computations to be performed on their applications get easy on-demand access to a powerful cloud computing environment at a lower cost. Website owners can generate revenue with their website visitors performing computations on behalf of others as the website owners may get compensated for their services, financially or otherwise. The framework enables a revenue-generating paradigm for website owners that can replace or supplement traditional advertising models. Website visitors may also be rewarded for computations the perform while visiting the website. This may include an option for an ad-free experience on websites, access to exclusive website content, features, and/or discounts, or financial incentives. The administrator of the framework facilitates the process, while being rewarded for their services financially and/or using other incentives.

In summary, various embodiments of the invention provide a computerized method for providing a distributed computing platform. The method includes receiving, by a computing device, a task for execution from a remote computer; calculating, by the computing device, a set of computation task segments for the task, wherein each computation task segment from the set of computation task segments comprises a portion of the task; calculating, by the computing device, a computation memory segment for each computation task segment from the set of computation task segments to generate a set of computation memory segments, wherein each computation memory segment defines a required amount of memory for its associated computation task segment; identifying, by the computing device, based on the set of computation task segments and the set of computation memory segments, a set of computation users to execute the set of computation task segments; distributing, by the computing device, the set of computation task segments and the set of computation memory segments to the set of computation users such that each computation user from the set of computation users receives a computation task segment from the set of computation task segments and an associated computation memory segment from the set of computation memory segments; receiving, by the computing device, a solution segment from each computation user in the set of computation users to generate a set of solution segments; combining, by the computing device, the set of solution segments into a solution; and transmitting, by the computing device, the solution to the remote computer. In other aspects, the disclosed subject matter includes a system for implementing the above method or a tangible computer readable medium comprising instructions for causing a processor to implement the above method.

Therefore in a first aspect, a computerized method for providing distributed computational resources to a plurality of remotely located users. The method includes receiving, from a host user, an indication that a portion of a website operated by the host user is available for providing access to remote computational users to perform remote processing tasks on behalf of others, and receiving, from a task user, a request to have application computations performed using the distributed computational resources. The method also includes providing a computation manager software component to the host user for transmission to the computation users of the website operated by the host user, wherein the computation manager software is stored within physical memory at each computation user and executed within a web browser application. The application computations are transmitted to the computation users for execution by a processor; and the results of the executed tasks are returned to the task user.

In some embodiments, the transmission of the computation manager software to the computation users occurs simultaneously with transmission of website content from the website operated by the host user, and, in some cases, may occur automatically and without notice to the computation users upon navigating to the website operated by the host user, whereas in other instances the host user may notify each computation user of the presence of the computation manager software prior to execution of the application computations. The task user may utilize a computation interface for submitting the application computation, and the interface may translates the requested application computations into computation task segments and computation memory segments. In some cases, a cloud-based service manager application, manages allocation of application computations among the computation users and tracks execution progress of the task(s).

In some embodiments, the application computations may include dependencies to other application computation(s), and results of the execution of the application computations may be shared among the computation users, either during execution or post-execution, and such sharing may be facilitated using a peer-to-peer connection. In some cases, computation users may be promoted to or identified as super computation users based on one or more utility measures of the computation users, such as average session time, median session time, expected session time, bandwidth, latency, open IP addresses, and NAT bound IP address.

In some cases, the host user may be compensated (e.g., financially) for use of the website and access to the computation users, who also may be compensated. In certain embodiments, the computation users comprise users operating heterogeneous browser applications and operating system platforms, but each receive the same computation manager software component.

In one particular implementation, the application computations comprise identifying and downloading content requested by the task user from a content server to the task user, thereby providing a distributed content delivery network using remotely located computation users.

In another aspect, a computerized system for providing distributed computational resources to a plurality of remotely located users includes at least one memory storing computer-executable instructions and at least one processing unit for executing the instructions stored in the memory. Execution of the instructions results in application modules that includes an interface module for facilitating the submission of requests to have application computations performed using the distributed computational resources; a data manager module for storing identities of host users and respective websites offered by host users for providing access to computation users; identities of task users requesting execution of application computation requests and results of the application computation requests once executed by computation users. A computation manager software component is also provided for transmission to the computation users of the websites operated by the host user, wherein the computation manager software is stored within physical memory at each computation user and executed within a web browser application. A cloud manager module manages allocation and tracking progress of application computations among the computation users. In some versions, the cloud manager module further tracks dependencies among application computations, and facilitates the sharing of results of the execution of the application computations among the computation users, using, for example a peer-to-peer server. In still other embodiments, the cloud manager module further identifies computation users as super computation users based on one or more utility measures of the computation users, such as average session time, median session time, expected session time, bandwidth, latency, open IP addresses, and NAT bound IP address.

In certain instances, the interface module translates the requested application computations into computation task segments and computation memory segments. In some embodiments, transmission of the computation manager software to the computation users occurs simultaneously with transmission of website content from the website operated by the host user, and in some cases, automatically and without notice to the computation users upon navigating to the website operated by the host user. In other cases, the host user notifies each computation user of the presence of the computation manager software prior to execution of the application computations.

The computation users may operate heterogeneous browser applications and/or operating systems, however receive the same computation manager software component for processing application computations. In some cases, the application computations comprise identifying and downloading content requested by the task user from a content server to the task user, thus providing a distributed content delivery network using the computation users as nodes in the network.

Also disclosed herein is a content delivery network (CDN) framework that uses distributed website-based technologies to efficiently deliver CDN content to website users. This approach also substantially reduces the necessity of servers and physical data centers—much of the CDN functionality is performed through website visitors through a distributed peer-to-peer (P2P) paradigm. Because of the server and data center requirement reduction, this distributed computing framework is more energy efficient and at a lower cost than other solutions.

In accordance with the disclosed subject matter, systems, methods, and non-transitory computer-readable media are provided for a content delivery network using distributed website-based technology. In some embodiments, a computerized method provides a content delivery network using distributed website-based technology. The method includes requesting, by a web browser being executed on the computing device, content from a web page hosted by a remote web server. The method includes receiving, by the computing device, the web page from the remote web server, the web page including an executable program configured to be executed inside of the web browser. The method includes executing, by the computing device, the executable program inside the web browser, causing the web browser to download a first portion of the requested content from the remote web server, identify a set of remote users that previously requested the content from the remote server and download a second portion of the requested content from one or more remote users from the set of remote users.

In other aspects, the disclosed subject matter includes a system for implementing the above method or a tangible computer readable medium comprising instructions for causing a processor to implement the above method.

These and other capabilities of the disclosed subject matter will be more fully understood after a review of the following figures and detailed description. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

Various objectives, features, and advantages of the disclosed subject matter can be more fully appreciated with reference to the following detailed description of the disclosed subject matter when considered in connection with the drawings, in which like reference numerals identify like elements.

DETAILED DESCRIPTION OF THE INVENTION

Figure 1:
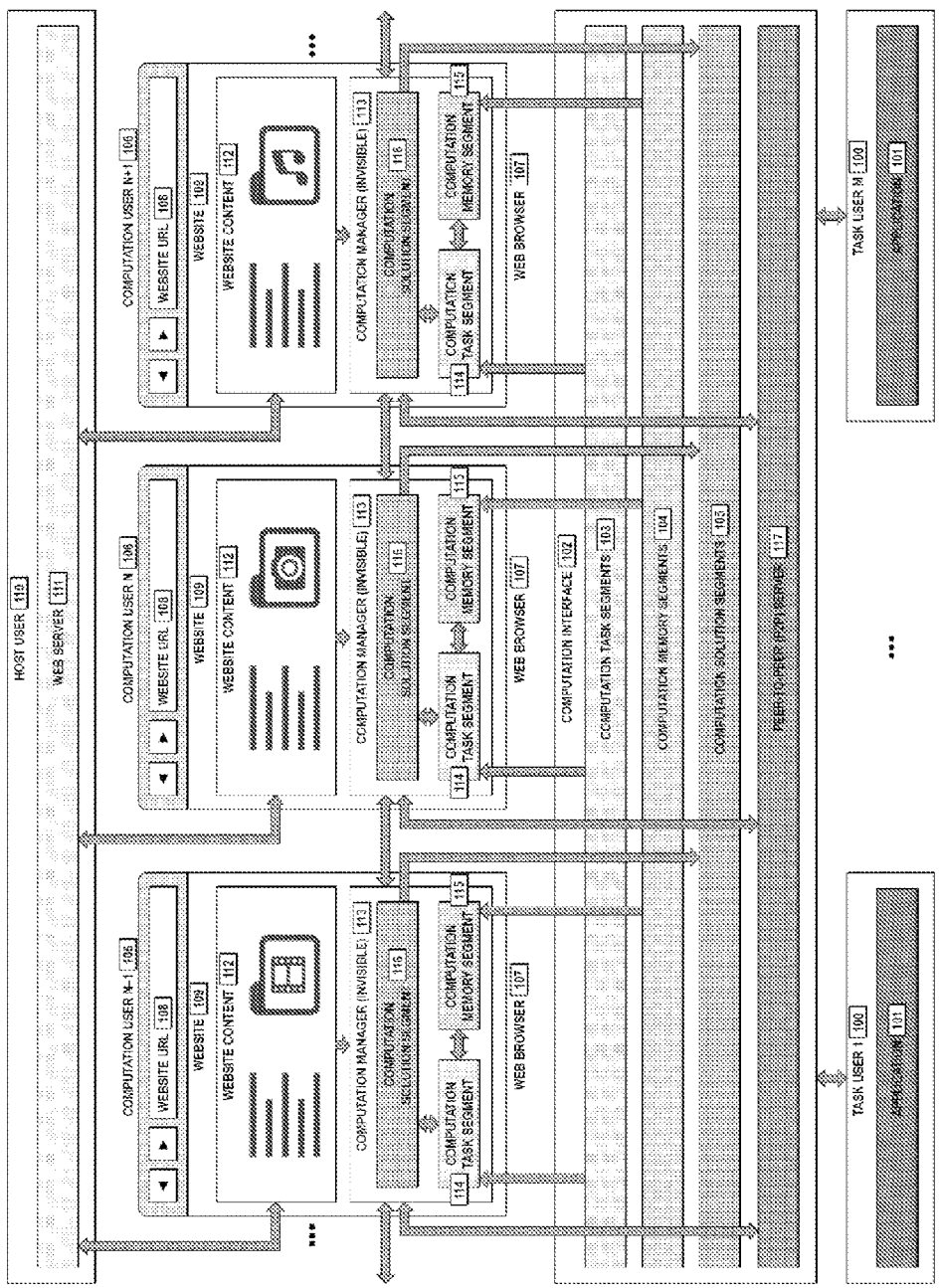
FIG. 1 is an exemplary framework for a massively-scalable distributed cloud computing platform in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Disclosed herein is a distributed computing framework using website-based technologies to efficiently distribute computations across users that are visiting designated websites. Exemplary embodiments of this framework can be configured such that the framework can perform one or more of the following functions.

The system provides a distributed computing solution that leverages the already-built and constantly-evolving infrastructure of website visitors, and aggregates their available resources to perform useful computations. Unlike prior systems, this approach can be configured to reside entirely inside the website and web browser, and does not require any downloading and/or installation of applications or browser plug-ins. In this approach, any website visitor can automatically become part of this framework. This framework offers the advantages of traditional distributed computing services that may require dedicated hardware infrastructure. Using this model, the necessity of dedicated servers is dramatically reduced, since most of the computations are performed by website visitors. Here, the servers are relatively lightweight, used for administrating and facilitating the framework.

This framework may create an environment where every party benefits. One embodiment of this includes, as an example, providing users who desire distributed computations to be performed on their applications to get easy on-demand access to a powerful cloud computing environment at a lower cost. Moreover, website owners can generate revenue with their website visitors performing computations. The website owners may get compensated for their services financially and/or using other incentives. This framework enables a revenue-generating paradigm for website owners that can replace or supplement traditional advertising models. Website visitors may also get rewarded for their computations, including, for example, an option for an ad-free experience on websites, access to exclusive website content, features, discounts and/or financial incentives. In some instances, a framework administrator facilitates the process, while being rewarded for their services financially and/or using other incentives.

This framework leverages aggregate computation resources of website visitors using the scalable distributed computing environment, where website visitors contribute their idle computation cycles, large applications are split into computation segments, the computation segments are executed by the website visitors and the computation results are aggregated to form the solution. Smaller infrastructures may be used to perform the computations than using traditional approaches. Most distributed applications may be implemented in this framework, including high-performance computing, big data, and most data center applications.

This approach can also leverage security features that protect every user in the framework by using homomorphic encryption on the data to be computed before it is transferred to the framework. As such, the framework maintains encryption of the data during the entire process, including when it is being processed and computed by other users. In one embodiment, the data may only be decrypted after it is transferred out of the framework.

Because of the geographical distribution of the users in the framework, the framework enables inherent data diversity features that may be leveraged as another layer of security. This may be accomplished through a function that maps the data allocation through geographic and temporal diversity. This allows the data to be separated in such a way that a single computation user does not have access to a large enough portion of the data to obtain any meaningful information, even if the data is not encrypted or its security is compromised.

For example, the system may ensure content authenticity by providing checksum (or similar) verification of the data and/or content before it is presented to the user. This may be accomplished by creating a hash (such as MD5) of the data and/or content on the web server. The framework also minimizes the peer-to-peer (P2P) exploitability of the service by, for example, following timeout guidelines of data and/or content delivery from other users, where if any data and/or content takes too long to receive (affecting the perceived performance of the service), it may be retrieved from the web server directly. Also, the web server can supply the users with size information of all incoming data and/or content, thus preventing a malicious user from sending other users a large amount of unwanted data, and allowing the data and/or content receiver to close the connection if more data and/or content than expected are being received.

The framework also uses a P2P paradigm to connect users to each other. Unlike prior systems, this approach can be configured to reside entirely inside the website and web browser, and does not require any downloading and/or installation of applications or browser plug-ins. In this approach, any website visitor can automatically become part of this framework. This P2P paradigm minimizes the necessity of the user interactions with the servers, creating a more efficient environment for both the users and the administrators. For all the P2P connections, the P2P server may use heuristics such as distance, latency, bandwidth, and packet loss, as well as the hardware profiles, spatial and temporal density, and current and past performance of the users and servers. These heuristics may aid in determining the most efficient P2P connections, as well as the most optimal balance between P2P and direct server connections, for the framework.

The framework also allows for flexibility in server ownership. The web server may be owned and operated by the website owner. However, the framework administration and facilitation servers are not necessarily required to be owned and operated by the website owner; they may be operated by a different entity or entities. The website owner may provide service for the entity or entities, for financial compensation or other incentives, by enabling the website visitors to the website to contribute to the framework. The website owner and/or the entity or entities may choose to also reward the website visitors for their contributions.

The framework is massively-scalable to hundreds and thousands of simultaneous distributed computing users, as it leverages a data center that contains the majority of the back-end hardware and software. Its main task is to connect users to computational resources, including (but not limited to) data storage and processing. The framework uses a flexible data storage mechanism that provides the platform with data storage capabilities. Different implementations may benefit from storing data in different proximities to the users and the data center, allowing for better and faster data access. Alternatively, the data could be stored outside of the data center, for example in a separate facility or on a content delivery network (CDN), as described below. The system also enables a diverse set of users to perform computations, with any hardware capable of processing instructions within the framework. This includes (but is not limited to) a processor, such as a CPU or a GPU, and other types of processing devices, such as FPGAs. The users may also have memory that gets used to store computation data or other data.

Furthermore, the framework implements a shell that ties together the available distributed resources into an interface that behaves like a UNIX shell, or a similar interactive shell. This custom shell may either be based on an existing shell (such as bash) or be customized To provide shell-like behavior in a distributed environment, the custom shell can be configured to manage the interaction between the offloaded computation and the stored data. It can also provide common shell functionality to the user, as well as the ability to compile source code into a usable form. Standard shell commands may be used to manipulate data and do not (necessarily) get sent to the users. Custom commands, such as custom compiled code, get processed on the users. A code conversion tool may be used to convert existing source code into a form that can run on this distributed computing framework.

The system also uses a shell deployment manager in the form of a shell interface that presents each unique user that desires this framework to perform computations on their applications with a contiguous region of data, as well as the ability to run applications on this network of distributed processing clients. The shell deployment manager isolates resources and deploys a shell instance for the users that desire for the framework to perform computations on their applications.

Certain existing technologies are leveraged to increase the flexibility of the framework. For example, the system make sue of Web Workers, which enable client-side execution of JavaScript scripts from an HTML page, Node.js, a server-side JavaScript engine that enables interactions with the client-side Web Workers, Apache, Helib, an efficient implementation of homomorphic encryption, OpenSSL, WebRTC, dotCloud Docker, Emscripten, Google Native Client (NaCl), and WebGL (Web Graphics Library).

Also disclosed herein is a content delivery network (CDN) framework that uses distributed website-based technologies similar to those described above to efficiently deliver CDN content to website users. This solution also substantially reduces the necessity of servers and physical data centers— much of the CDN functionality is performed through website visitors through a distributed peer-to-peer (P2P) paradigm. Because of the server and data center requirement reduction, this distributed computing framework is more energy efficient and at a lower cost than other solutions.

Exemplary embodiments of this framework use a unique P2P paradigm to deliver CDN content to and from website users. Unlike conventional DCN systems, this approach resides entirely inside the website and web browser, and does not require any downloading and/or installation of applications or browser plug-ins. As such, any website visitor can automatically become part of this framework. This approach minimizes the necessity of CDN servers in a fully-functional CDN environment by decreasing user interactions with CDN servers. This is accomplished with an automated P2P paradigm, where users seeking CDN content obtain it from other users, and in turn then share it themselves.

The process utilizes a lightweight CDN server that seeds the CDN content for the first user or few users visiting the website. Subsequent users have the option to obtain CDN content from either the CDN server or other users, whichever will produce better performance. A lightweight P2P server makes this determination for the user based on heuristics such as distance, latency, bandwidth, and packet loss, as well as the hardware profiles, spatial and temporal density, and current and past performance of CDN servers and users. This approach provides a purely-software CDN solution for website owners, with all the advantages of traditional CDN services that would otherwise require hardware infrastructure. In one framework operational model, the website owner can run very lightweight CDN and P2P servers directly in their web servers.

This approach also allows for flexibility in server ownership. The web server may be owned and operated by the website owner, however, the CDN and P2P servers are not necessarily required to be owned and operated by the website owner; they may be operated by a different entity or entities. This entity or entities may provide this CDN service for the website owner for financial compensation or other incentives. As a result, the model enables websites hosting the CDN service to have an option of using it for their own CDN content, or using their distribution to have other entities have access to CDN content, or both. This allows entities with many website visitors to either deliver CDN content not just for their own users, but for other entities as well. The enabling entities may be rewarded for the service with financial compensation or other incentives.

Using this distributed model, the CDN is immensely scalable due to the unique inverse-performance nature of more users joining the framework. As more users join the framework and become sources of CDN content, the performance of the CDN actually increases. As the user geographic density increases with more users, each new user seeking CDN content has a greater chance to be in the performance vicinity of other users. There are also multiple distribution options of the CDN server. For example, the CDN can be seeded with any number of distributed CDN servers, including traditional CDN servers. Once the CDN is seeded, each incoming user visiting the website potentially becomes a temporary CDN server. The P2P server may also be distributed among the users, with some users being delegated as temporary P2P servers, servicing other users. The users that take on that status do so because of their geographic and performance characteristics, as well as their duration of the website visit. Once a user becomes a temporary P2P server, it can service other users who have geographic and performance advantages of communicating with a temporary P2P server instead of the static P2P server, until the user leaves the framework.

The CDN uses similar security services and technical components as does the distributed processing framework described above.

Referring to FIG. 1, an exemplary embodiment of the framework concept is illustrated and include the following elements.

Task Users (100) (e.g. Task User 1 and Task User M), which are end users that desire computations to be performed on their Applications (101). The Task Users (100) have the opportunity to transfer the desired computations to the framework, thereby outsourcing their Applications (101).

Application (101), which is computer software that is designed to perform useful tasks and computations. These Applications (101) are employed by the Task User (100). The goal of the Task User (100) is to outsource these Applications (101) to the framework, and have the framework perform the computations and return the resulting solutions.

Computation Interface (102), which serves as an intermediary between the Task Users (100) and the rest of the framework. The Computation Interface (102) converts the desired Applications (101) from the Task Users (100) into Computation Task Segments (103) and Computation Memory Segments (104), which may be aggregately computed by the Computation Users (106) in the framework.

Computation Task Segments (103), which are abstracted segments of the Application (101) that are performing computation tasks. The segment size of the Computation Task Segments (103) may be predetermined or tailored dynamically based on any number of heuristics. These heuristics include (but are not limited to) Task User (100) and Application (101) specifications, Computation Interface (102) present and/or past performance, including the availability of computation, memory, bandwidth, and other resources Host User (110) specifications and the present and/or past performance of the Web Server (111) and/or the abundance of available Computation Users (106) that contribute to the framework, as well as their present and/or past performance, including the availability of computation, memory, bandwidth, and other resources. The rates of Computation Users (106) joining and leaving the framework may also be useful heuristics.

Computation Memory Segments (104), which are abstracted segments of the Application (101) that are stored in memory. The segment size of the Computation Memory Segments (104) may be predetermined or tailored dynamically based on the aforementioned heuristics for the Computation Task Segments (103).

Computation Solution Segments (105), which are aggregate resulting solutions to the computations performed and returned by the framework. Once the resulting Computation Solution Segments (105) are returned to the Computation Interface (102), the Computation Solution Segments (105) are made accessible to the corresponding Task Users (100).

Computation Users (106) (e.g. Computation User N-1, Computation User N, and Computation User N+1), which are end users that can access the framework on a personal computer (PC), notebook, smartphone, tablet, or any other such device that can support a Web Browser (107). The Computation Users (106) are the users that simultaneously browse the Website (109) filled with Website Content (112) and automatically connect to the framework and perform computations using the Computation Manager (113). Along with the regular Website Content (112) of the Website (109), the Computation Manager (113) is automatically transferred to the Computation User (106) through the Website (109).

Web Browser (107), which gives the Computation Users (106) access to Websites (109), Website URLs (108), a character string that constitutes a reference to the Website (109) resources, and Websites (109), some or all of which participate in the framework.

Host User (110), which is the owner and/or operator of the Website (109). The Host User (110) determines which parts of the Website (109) and Computation Users (106) are to be connected to the Computation Interface (102) through the Computation Manager (113). This distinction may be handled dynamically as well, during the operation of the Website (109).

Web Server (111), which is owned and/or operated by the Host User (110). The Web Server (111) stores and helps deliver copies of the Website Content (112) and the Computation Manager (113) for the Computation Users (106) that visit the Website (109).

Website Content (112), which includes all the content on the Website (109). This content may comprise anything from text and/or HTML content to image, audio, video, document, data, and/or application content. The Website Content (112) also includes the Computation Manager (113).

Computation Manager (113), which connects the Computation Users (106) to the Computation Interface (102), as well as other Computation Users (106). This enables Computation Users (106) to perform computations for Applications (101) submitted by the Task Users (100).

Computation Task Segment (114), which is a segment of the Computation Task Segments (103) that is transferred from the Computation Interface (102) to the Computation User (106). The matching between the Computation Users (106) and Computation Task Segments (114) may be accomplished using (but not limited to) heuristic, statistical, and/or random distribution assignments, or any combination thereof.

Computation Memory Segment (115), which is a segment of the Computation Memory Segments (104) that is transferred from the Computation Interface (102) to the Computation User (106). The Computation Memory Segment (115) corresponds to the segment of memory storage used by the Computation Task Segment (114).

Computation Solution Segment (116), which is the resulting solution produced by the Computation Task Segment (114). The Computation Solution Segment (116) is a segment of the aggregate computation solution in the Computation Solution Segments (105). When the Computation Solution Segment (116) is complete, it is transferred to the Computation Solution Segments (105) part of the Computation Interface (102). When all the Computation Solution Segments (105) are aggregated, the combined resulting solution is transferred and/or granted access to the Task User (100).

Peer-to-Peer (P2P) Server (117), which facilitates the direct connection between Computation Users (100) through the Computation Manager (113). This enables the Computation Manager (113) for each Computation User (106) to share the Computation Solution Segment (116) directly with other Computation Users (106) instead of through the Computation Interface (102), saving resources and increasing the performance of the Computation Interface (102). This is useful for data dependencies in the Computation Task Segments (103). The P2P Server (117) also allows sharing of the Computation Task Segment (114) and the corresponding Computation Memory Segment (115) with other Computation Users (106). This also saves resources and increases the performance of the Computation Interface (102).

In FIG. 1, a Task User (100) (e.g. Task User 1) desires to use the framework to perform computations on the Application (101), and return the resulting solution. To accomplish this, the Task User (100) connects to the Computation Interface (102) and transmits the request. The Computation Interface (102) translates the desired Application (101) into Computation Task Segments (103) and Computation Memory Segments (104). These segments are now ready for computation by the Computation Users (106).

The Host User (110), which owns and/or operates the Website (109), determines a priori that for some or all parts of the Website (109) and Computation Users (106), the Computation Users (106) will automatically become part of the framework and contribute their computations. This is accomplished when the Computation Users (106) browse the Website (109), along with the Website Content (112), the Computation Manager (113) is automatically transferred from the Web Server (111) to the Computation User (106) through the Website (109). This way, the selected Computation Users (106) automatically connect to the framework and perform computations using the Computation Manager (113). In this example, the Computation Manager (113) is invisible to the Computation User (106), and does not require manual interaction. The Computation User (106) may not even be aware that the Computation Manager (113) is present and operational, unless notified by the Host User (110). The Host User (110) may offer as much insight into the Computation Manager (113) for Computation Users (106) as desired, even providing visible representations and abstractions of the processing and the types of Applications (101).

When a Computation User (106) (e.g. Computation User N) types in the Website URL (108) of the Website (109) in the Web Browser (107), the Website Content (112) is first loaded. If this Computation User (106) is selected to participate in the framework by the Host User (110), the Computation Manager (113) is also then loaded. The Computation Manager (113) then connects with the Computation Interface (102), and automatically loads the first Computation Task Segment (114) and Computation Memory Segment (115) for the Computation User (106). The Computation User (106) then performs the computation on these first segments, and stores the resulting solution in the Computation Solution Segment (116).

Depending on whether there are data dependencies, the Computation User (106) may also connect with other Computation Users (106) to transmit or receive other Computation Solution Segments (116) at any time during the computation process. This P2P connection between Computation Users (106) is managed by the Peer-to-Peer (P2P) Server (117) in the Computation Interface (102), which tells each Computation User (106) which other Computation Users (106) have the desired Computation Solution Segment (116). When the Computation Solution Segment (116) is loaded from other Computation Users (106), it may be added to the Computation Memory Segment (115) for further computation.

In some instances, the Computation User (106) may desire to share the Computation Task Segment (114) and/or Computation Memory Segment (115) with other Computation Users (106). This may be beneficial for either redundancy and/or efficiency. For redundancy, if two or more Computation Users (106) are performing the same Computation Task Segment (114) and/or Computation Memory Segment (115). This distribution may be performed directly by the Computation Users (106) in this P2P paradigm, and/or the Computation Interface (102), or any combination thereof. With regard to efficiency, if a Computation User (106) distributes parts of their Computation Task Segment (114) and/or Computation Memory Segment (115) with other Computation Users (106). Each Computation User (106) then performs computations on different parts of the task, decreasing the computation time. The resulting solutions to the divided tasks may then be collected by the original Computation User (106), another Computation User (106), or sent directly to the Computation Interface (102) in pieces by all the corresponding Computation Users (106).

In each of these cases in the P2P paradigm, the performance of the Computation Interface (102) is improved, since some of the data movement is performed directly between the Computation Users (106). For all the P2P connections, the Peer-to-Peer (P2P) Server (117) may use heuristics such as distance, latency, bandwidth, and packet loss, as well as the hardware profiles, spatial and temporal density, and current and past performance of the Host User (110), Computation Users (106), and the Computation Interface (102). These heuristics may aid in determining the most efficient P2P connections, as well as the most optimal balance between P2P and direct server connections, for the framework.

When the Computation User (106) completes computation of the Computation Task Segment (114), the resulting solution in the Computation Solution Segment (116) is then sent to the Computation Interface (102). The Computation Interface (102) then stores this segment in its corresponding location in the Computation Solution Segments (105). When all the Computation Solution Segments (105) are aggregated, the combined resulting solution is transferred and/or granted access to the Task User (100).

FIG. 1 depicts an exemplary framework concept, and not a definitive representation. For example, the number of Task Users (100), Applications (101) within each Task User (100), Computation Interfaces (102), Host Users (110), Computation Users (106), Web Servers (111) within each Computation User (106), and P2P connections between Computation Users (106), are all interchangeable in this framework. The Peer-to-Peer (P2P) Server (117) may also reside outside of the Computation Interface (102), and may reside in the Host User (110), for example. In fact, some or all of the contents in the Computation Interface (102) may reside in the Host User (110), and some or all of the contents in the Host User (102) may reside in the Computation Interface (110). In some implementations, the Website (109) may not have Website Content (112), and only have the Computation Manager (113). The Computation Task Segments (103) and Computation Memory Segments (104), as well as the Computation Task Segment (114) and Computation Memory Segment (115), are separated for logical representation; in some implementations, these may be a single logical or physical structure. In some implementations, some or all parts of the Computation Task Segments (103), Computation Memory Segments (104), Computation Solution Segments (105), Computation Task Segment (114), Computation Memory Segment (115), and/or Computation Solution Segment (116) may be populated during the computation sequence from other sources on the Internet. Furthermore, the P2P connections between the Computation Users (106) may produce any desired topology, and any Computation User (106) may connect to any number of other Computation Users (106), as deemed appropriate by the Peer-to-Peer (P2P) Server (117).

Furthermore, some of the details in FIG. 1 are excluded and abstracted for clarity. These detailed should be apparent to one skilled in the art. For example, not shown are Internet connections between the Task Users (100) and the Computation Interface (102), the Computation Interface (102) and the Computation Users (106), the Computation Users (106) and the Host User (110), as well as the Computation Users (106) and other Computation Users (106).

Figure 2:
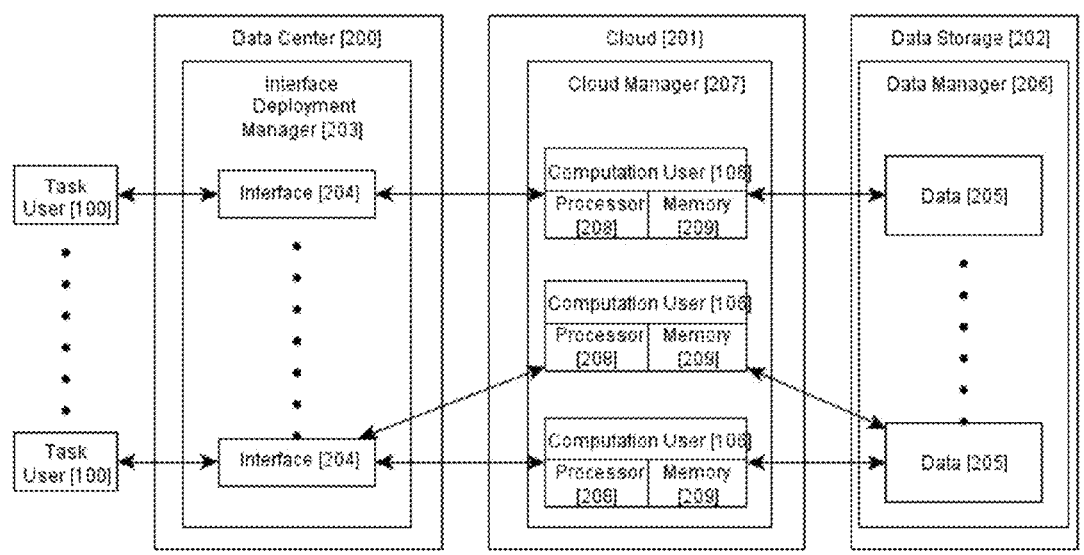
FIG. 2 is an exemplary detailed logical subset of the framework for a massively-scalable distributed cloud computing platform in accordance with some embodiments.

FIG. 2 depicts the framework structure. This figure includes the Data Center (200), Data Storage (202), and Cloud (201) components. Each of these components includes further subcomponents, each of which is described below.

The Data Center (200) contains the majority of the back-end hardware and software, and its primary task is to connect the Task User (100) to computational resources, including (but not limited to) data storage and processing. It includes an Interface Deployment Manager (203) that controls the accessibility of an Interface (204) to Task Users (100), and controls the creation of a control interface for each Task User (100) accessing the platform to perform computations. The Interface (204) also allows the Task User (100) to make use of the Data Storage (202) and Cloud (201) services. A Task User (100) may request multiple simultaneous Interfaces (200) to perform multiple tasks, or to view statistics data on a single Application (101) from multiple places.

The Data Storage (202) component provides the platform with data storage capabilities. FIG. 2 shows the Data Storage (202) component conceptually separated from the other components within the framework, since different implementations may benefit from storing data in different proximities to the Cloud (201), the Data Center (200), and the Task Users (100). However, Data Storage (202) can be part of the Data Center (200) if it is beneficial for a particular implementation. This may, in some instances, provide better and faster data access to Data (205) by Computation Users (106), as well as the Interface (204). Alternatively, Data (205) may be stored outside of the Data Center (200), for example in a separate facility or on a content delivery network (CDN).

The Data Manager (206) resolves any concurrency issues that arise from simultaneous data access from more than one node, and Data (205) is a storage block that allows a Task User (100) to store data to be processed, processing results, or other data for an extended period of time. The Data (205) is accessible to the Task User (100), and may also be made accessible to the Computation Users (106). Cloud (201) is the computational backbone of the framework. It includes all the Computation Users (106) that can perform computations from a set of instructions. These instructions may be stored in the form of a program in the Data Storage (202), transferred from the Interface (204), or sent directly from the Task User (100).

The Cloud Manager (207) is responsible for task management. It tracks Computation User (106) availability and facilitates computation task distribution among available Computation Users (106). It can also relay requests and responses between different parts of the framework and Computation Users (106) as necessary. Due to the nature of the framework, Computation Users (106) may not be available long enough to finish a specific task. In such cases, the Cloud Manager (207) is responsible for identifying a failed computation and adding it back to the task queue (potentially as a high-priority task). This is also the layer at which redundancy may be implemented. If, for example, a fast result verification algorithm is unavailable, computing a task on multiple independent clients can serve as a substitute.

The Computation User (106) includes any hardware capable of processing instructions within the framework. This includes (but is not limited to) a Processor (208), such as CPUs or a GPUs, and other types of processing devices, such as FPGAs. A client may also have memory, such as Memory (209) or hard disk space that gets used to store computation data or other data. When the framework is operational, there should be as many active Computation Users (106) as can be supported by the Cloud Manager (207) for ideal operation.

Figure 3:
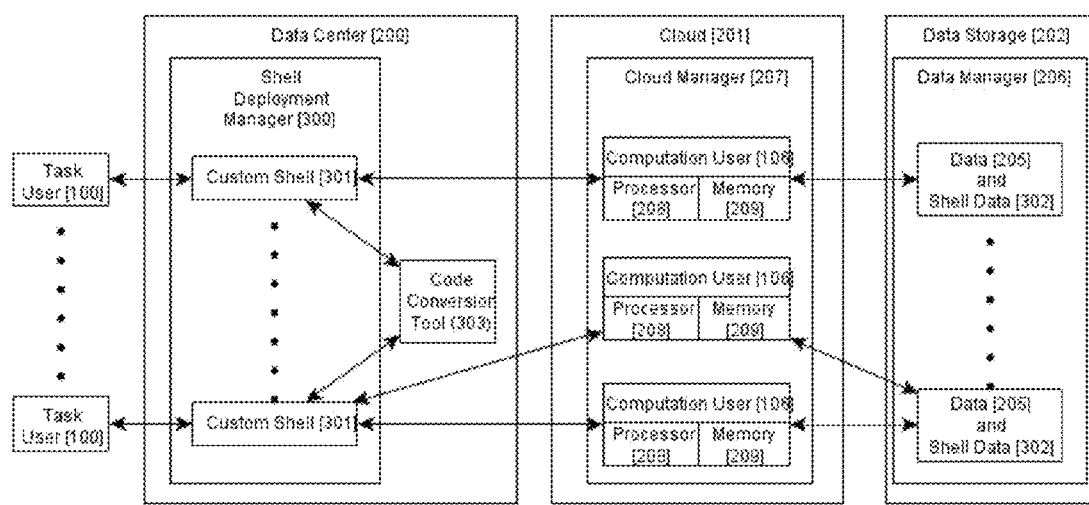
FIG. 3 is an exemplary detailed logical subset of the framework for a massively-scalable distributed cloud computing platform in accordance with some embodiments.

Several variations of the framework provide examples of possible implementations. FIG. 3 shows one such exemplary implementation of the concept described in FIG. 2 in which an interactive shell provides a way for a user to interact with the system. The system includes the same major components—Data Center (200), Data Storage (202), and Cloud (201)—but the Data Center (200) and Data Storage (202) have some implementation-specific changes.

For example, the Data Center (200) as depicted in FIG. 3, supports tools that make it simpler for a Task User (100) to port existing software to the system. These tools include, for example, a Shell Deployment Manager (300) that presents each user with a shell interface to a contiguous region of data and to manage conflicts among users, as well as the ability to run applications on the network of distributed processing clients. The Shell Deployment Manager (300) isolates resources and deploys a shell instance for a user. This may be implemented using an existing or modified framework such as dotCloud Docker, or may be a custom application.

A Custom Shell (301) may be used to bring together the available distributed resources into an interface that behaves like a UNIX shell, or a similar interactive shell. The Custom Shell (301) may either be based on an existing shell (such as bash) or be custom. To provide shell-like behavior in a distributed environment, the Custom Shell (301) can be configured to manage the interaction between the offloaded computation and the stored data. It can also provide common shell functionality to the user, as well as the ability to compile source code into a usable form. Standard shell commands may be used to manipulate data and do not (necessarily) get sent to the Computation Users (106). Custom commands, such as custom compiled code, get processed on the Computation Users (106). Shell Data (302) is any data for use by the Custom Shell (301) that is not visible to the user. This may include, but is not limited to, custom settings, file system information, and metadata.

A Code Conversion Tool (303) may be used to convert existing source code into a form that can run on the distributed platform. This tool may be available within the Data Center (200) and may build source code into one or more executables, each of which may run on a specific supported Computation User (106). If the Cloud (201) is made up of a heterogeneous mix of Computation Users (106), each Computation User (106) receives an executable meant for its processor type. If multiple executables are built for a single application (for example, in the case of the availability of CPU-based and GPU-based Processors (208), metadata about the different executables may be stored in the Shell Data (302) space. When a user lists executable files within their Data (205), a single executable will be visible, even though it may represent multiple executables built with the Code Conversion Tool (303).

A Code Conversion Tool (213) is used to maximize Task User (100) code portability by converting any code that cannot be run on the Computation Users (106) directly into a compatible format. For example, if the Computation User (106) is a JavaScript-enabled browser and the Task User (100) wishes to run C code, a tool such as Emscripten can convert LLVM bitcode into JavaScript that can run within a browser. The resulting code can then be deployed by the Shell Deployment Manager (210) onto a large number of compute nodes. In order to operate in a distributed manner, a custom I/O library converts any references to local file streams to network streams from Data Storage (202), so files can be accessed seamlessly over the network. This tool may also be used to split applications into segments that are statistically likely to finish within the amount of time a Computation User (106) is expected to be available.

In some embodiments, a Computation User (106) may consist of a JavaScript Browser. In this case, scripts may be launched in the foreground or in the background using a technology such as Web Workers. Alternatively, Google Native Client (NaCl) may be used to run native code directly in the browser. WebGL and other GPU frameworks may also be used for computation, in addition to any Processor (208) resources the machine may have. As browsers are constantly evolving, it is expected to see various improvements to execute code in the browser in a seamless manner.

Along with the above technologies, this system may use encryption processes to secure the data and computational algorithms. This framework uses a number of possible encryption methods, such as conventional encryption methods, and fully homomorphic encryption across the entire platform. This allows the chaining together of data transfer, data computation, and any other service in the framework to be carried out in ciphertext as opposed to plain text. This allows both the output and input of a computation to remain encrypted, which when decrypted matches the result of the operations performed on plain text. As a result, once data is encrypted it does not need to be decrypted until the entity which encrypted the file decides to decrypt the file in order to see the results of the computations.

In some embodiments, a fully homomorphic security system supports addition, subtraction, multiplication, and division (thereby preserving the ring structure of the plaintexts), which is far more powerful than other semi-homomorphic and non-homomorphic systems that do not allow for such encryption. Using this scheme, any circuit in the distributed computing platform can be homomorphically evaluated, effectively allowing the construction of programs, which may be run on encryptions of their inputs to produce an encryption of their output. Since such a program never decrypts its input, it can be run by an untrusted party without revealing its inputs and internal state.

In an exemplary encryption task, a Task User (100) (e.g. Task User 1) executes a process whereby data encryption is performed, and a process whereby restriction information is generated by the secret key is transmitted to a Web Server (111). The Web Server (111) then executes a process that receives, possibly unique and encrypted, identity information from the Task User (100), which is then held on a storage device connected to the Web Server (111). Next, the Web Server can then execute a computation process (such as a homomorphic computation process, or any other computation process) on the encrypted data that is sent from the Task User (100) and received on the Computational Interface (102). When the bit length of the encrypted text during the computation process or in the computation process result is equal to or greater than a prescribed threshold value, the computation is then considered to be encrypted and is then sent through the rest of the framework for computation. During the encryption process, a decoding function is generated, and is saved in memory along with the private key for outputting to the task user at the end of the computation.

When the computation is complete, the results are amalgamated in the computation interface and sent back to the corresponding Task User (100). The resultant output, the private key, and the predetermined decoding function are received by the Task User (100) with the correct private key, whereby, the decoding function and thereby the output is decrypted. After the decryption process the results are again readable in plaintext.

Figure 4:
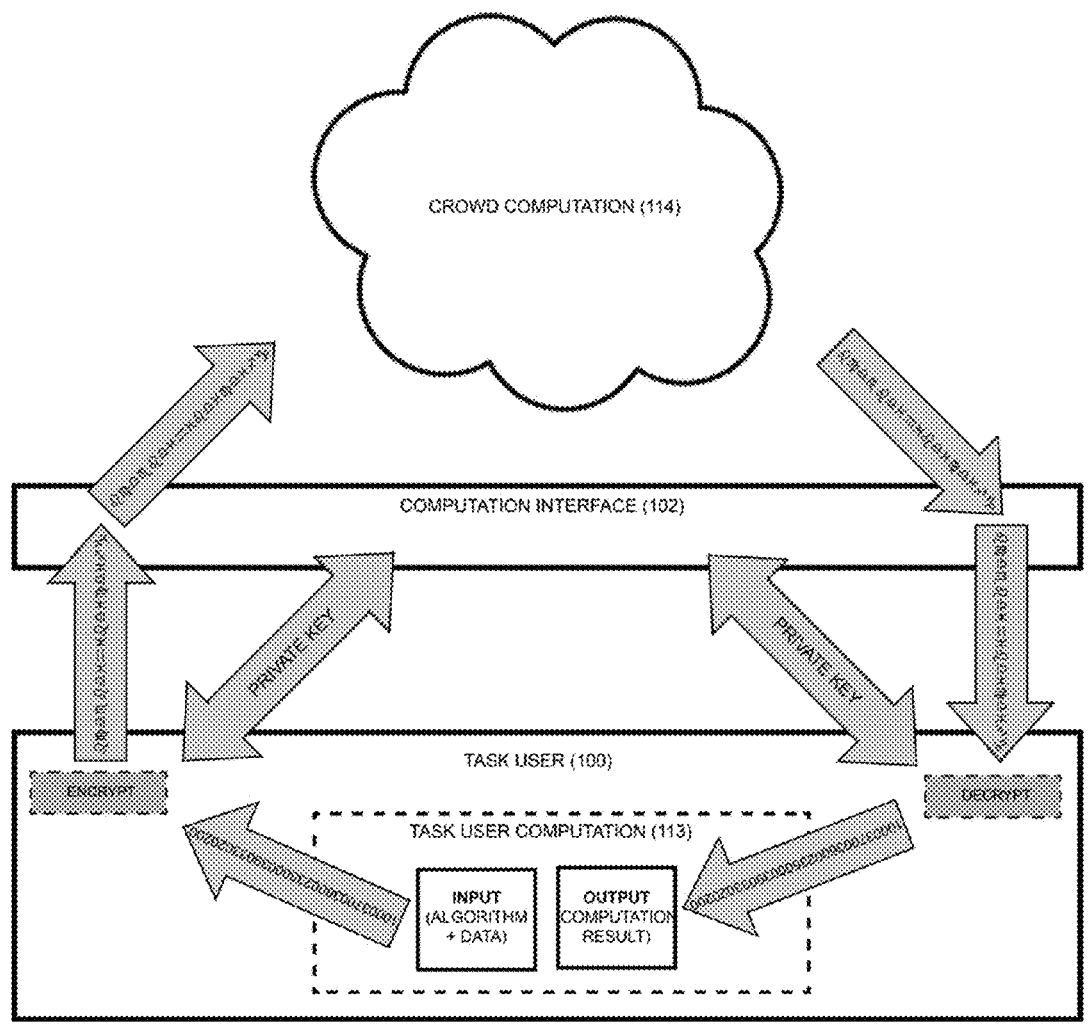
FIG. 4 is an exemplary homomorphic encryption scheme for a massively-scalable distributed cloud computing platform in accordance with some embodiments.
Figure 5:
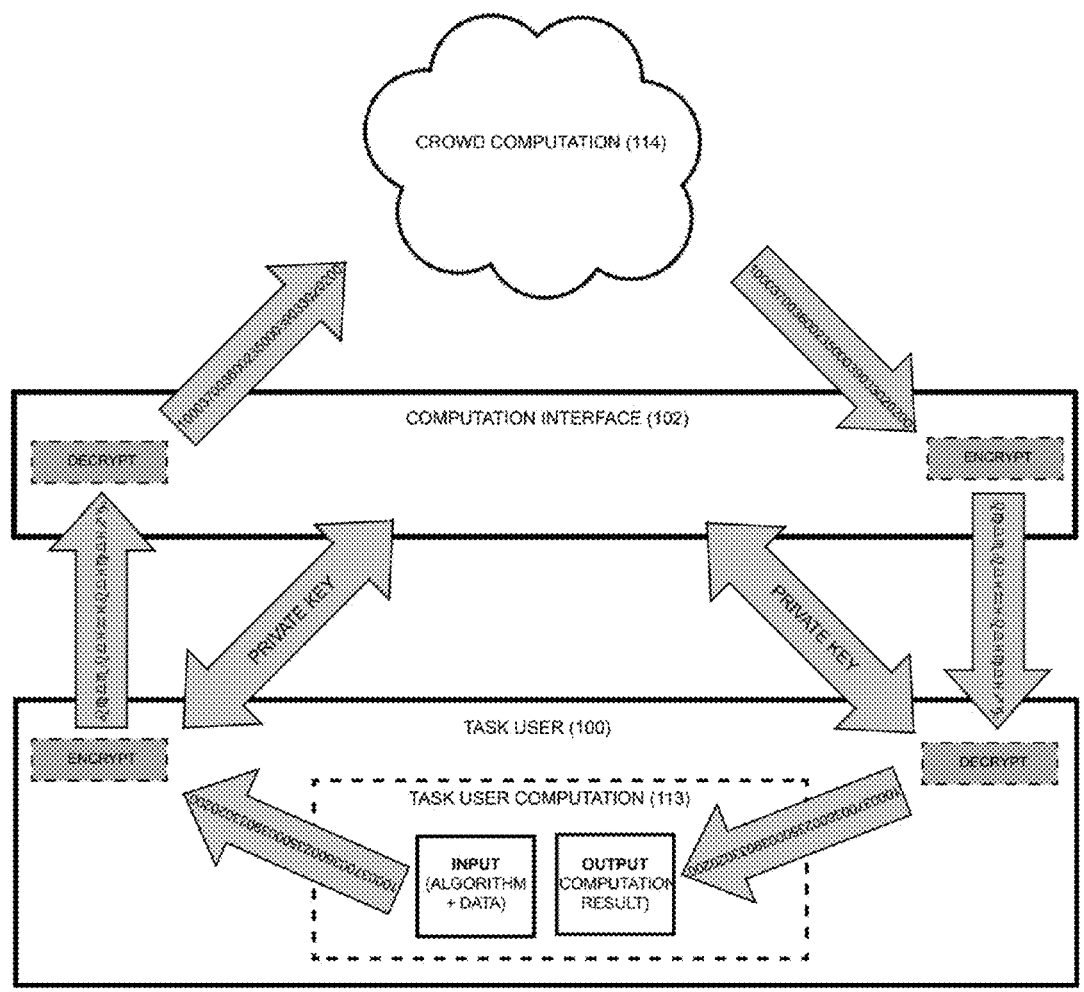
FIG. 5 is an exemplary more conventional encryption scheme for a massively-scalable distributed cloud computing platform in accordance with some embodiments.

The above encryption and decryption processes are represented in FIGS. 4 and 5, showing a diagrammatic representation of a possible encryption scheme, the homomorphic encryption scheme represented in FIG. 4, and a more conventional encryption scheme shown in FIG. 5. Both encryption schemes are possible in this framework, along with even more general encryption schemes.

In the example depicted in FIG. 4, a Task User (100) has a confidential computation (algorithm and data) that they desire to compute using the distributed computing framework, but they do not want anyone to access the data or the algorithm—not even the persons or organizations who own or administer the framework. Conventional encryption, one possible encryption method, depicted in FIG. 5, protects the information of the Task User (100) while it is in transit, but not while the computation is being performed in the distributed computing framework. Homomorphic encryption offers security from the moment the data stream leaves the Task User (100) until it returns. The strategy can be configured such that all the arithmetical and logical operations needed in the computation (symbolized here as a cloud) can be applied to the encrypted form of the data. In FIG. 4, the distinction between encrypted and unencrypted data—between ciphertext and plaintext—is suggested by a typographic convention: the ciphertext is shown in numerals of the Wingdings alphabet, and plaintext by standard numerals.

FIG. 5 depicts an example conventional encryption applied to this distributed computing framework. Conventional encryption in FIG. 5 protects the task information of the Task User (100) while it is in transit, but not while the computation is being performed in this distributed computing framework. This is different from homomorphic encryption, which can also be used in this distributed computing platform, where encryption is offered from the moment the data stream leaves the Task User (100) until it returns. In FIG. 5, the distinction between encrypted and unencrypted data—between ciphertext and plaintext—is suggested by a typographic convention: the ciphertext is shown in numerals of the Wingdings alphabet, and plaintext by standard numerals.

Figure 6:
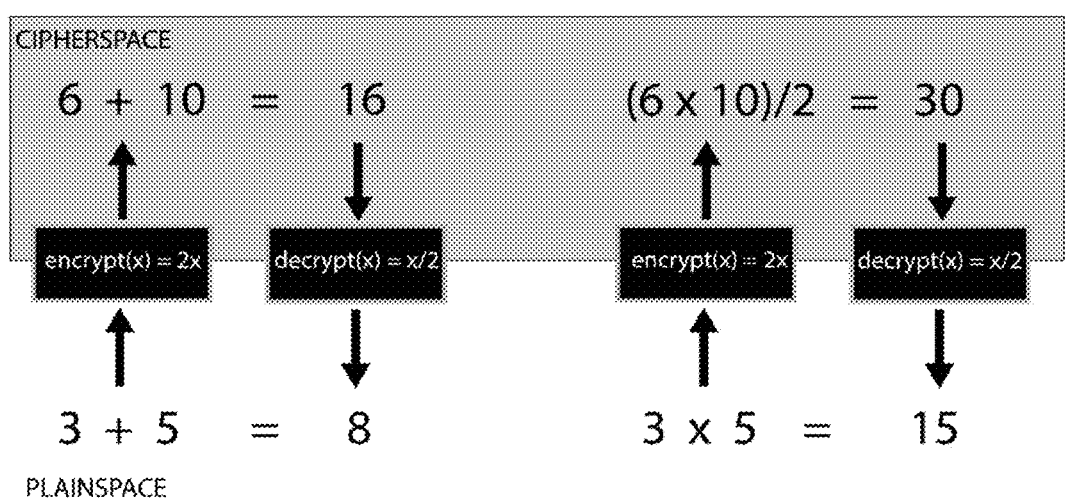
FIG. 6 is an exemplary homomorphism concept for a massively-scalable distributed cloud computing platform in accordance with some embodiments.

FIG. 6 depicts the concept of the homomorphism in this framework, illustrating a parallel linkage between operations on two sets of objects. In this example, the sets of objects are the set of all integers (lower panel) and the set of even integers (upper panel). The operations on the objects are addition and multiplication. Going back and forth between the two sets is just a matter of doubling or halving a number. Addition works the same way in both sets. In the case of multiplication, an adjustment is needed: for even numbers, the product of X and Y is defined as (XxY)/2. These sets and operations can be pressed into service as a rudimentary homomorphic cryptosystem. Plaintext integers are encrypted by doubling; then any sequence of additions and multiplications can be carried out; finally, the result is decrypted by halving. While the encryption may involve a more complicated and general encryption process, but this shows the conceptual nature of the homomorphic encryption process.

Along with the above-described encrypted methods, the framework includes inherent security features that may be leveraged for enhanced security. When the Computation Interface (102) receives a computation to distribute across the Computation Users (106), there is a function that maps the data, whereby data is allocated through geographic and temporal diversity. This allows the data to be separated is such a way that a single Computation User (106) does not have access to a large enough portion of the Task User (100) data to obtain any meaningful information, even if the data was seen in plaintext.

The framework also ensures content authenticity by providing checksum (or similar) verification of the data and/or content before it is presented to the user. This may be accomplished using the following process. First, a hash function (such as MD5) is applied to the data and/or content on the web server, the web server supplies hashes to the users for any incoming data and/or content, and each user verifies the hash values of all incoming data and/or content before performing computations and/or sharing it with other users. If a specific user is found to be sending data and/or content that does not match the intended hash, that user may be reported by users receiving the malicious data and/or content. The offending user may then be barred from further sending or receiving and data and/or content.

This framework also minimizes the P2P exploitability of the service. This includes (but is not limited to) following timeout guidelines of data and/or content delivery from other users, such that if any data and/or content takes too long to receive (affecting the perceived performance of the service), it may be retrieved from the web server directly. In some instances, the web server supplies sizes to the users of all incoming data and/or content. This prevents a malicious user from sending other users a large amount of unwanted data, by allowing the data and/or content receiver to close the connection if more data and/or content than expected are being received.

Certain embodiments of the systems described herein provide a distributed peer-to-peer network composed of Computation Users (106) and Super Computation Users (131). A Super Computation User (131) is a node in the distributed computing network that operates both as a server to a set of clients, and as a client in a network of Computation Users (106). Computation Users (106) have high utility relative to non-Computation Users (106). The high utility refers to Computation Users (106) that are "better" (for example a higher level of bandwidth, CPU speed, memory capacity, or having NAT-bound versus open IP addresses) at providing Computation User (106) services. The goals of the Super Computation User (131) network are to exploit heterogeneity in P2P networks by using higher utility Computation Users (106) to provide services, and for Super Computation Users (131) to provide redundant instances of system services. This allows the peer-to-peer distributed computing system to have the properties of: scalability, load balancing, fail-over, and robustness to load failures and data loss.

Figure 7:
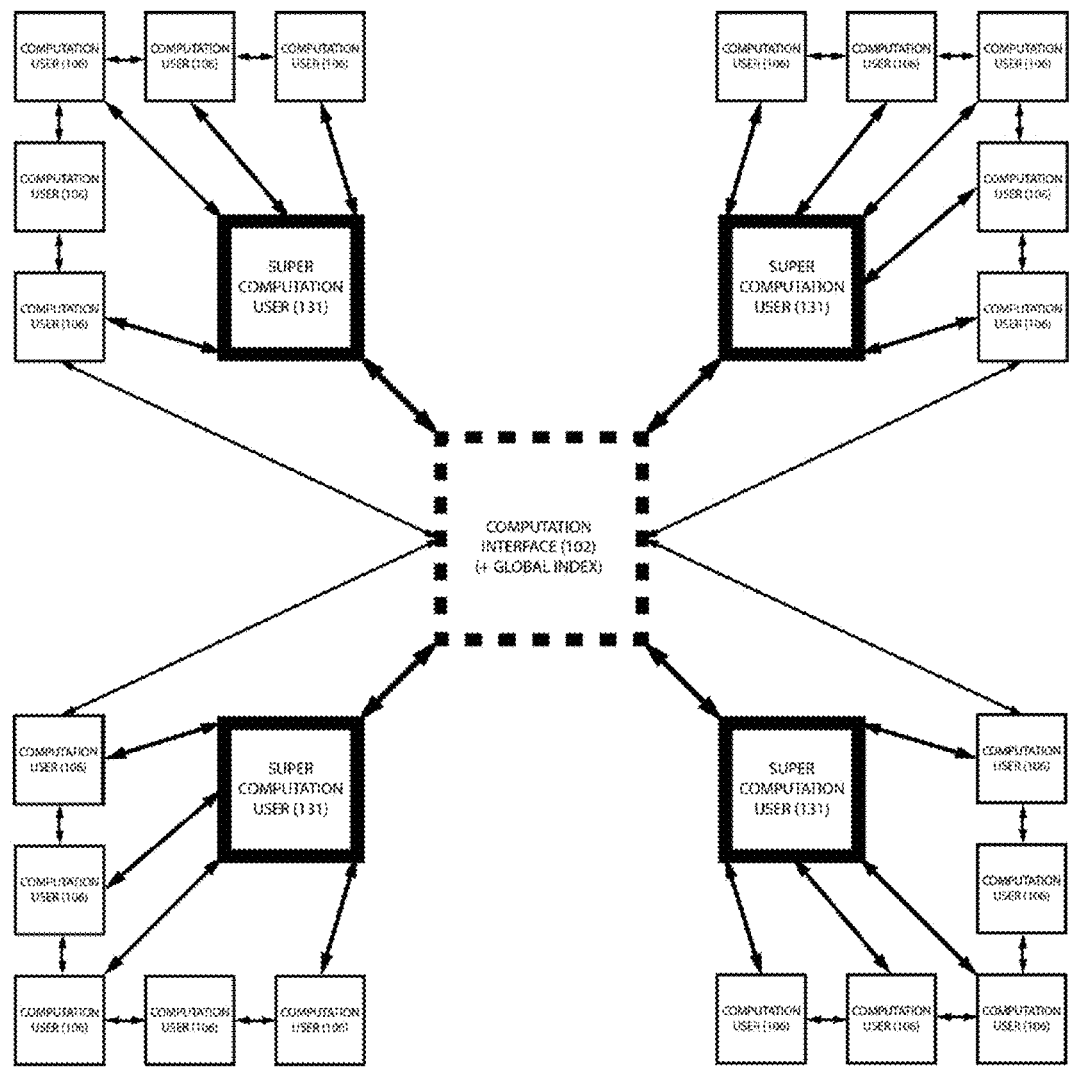
FIG. 7 is an exemplary super computation user architecture in the P2P network for a massively-scalable distributed cloud computing platform in accordance with some embodiments.
Figure 8:
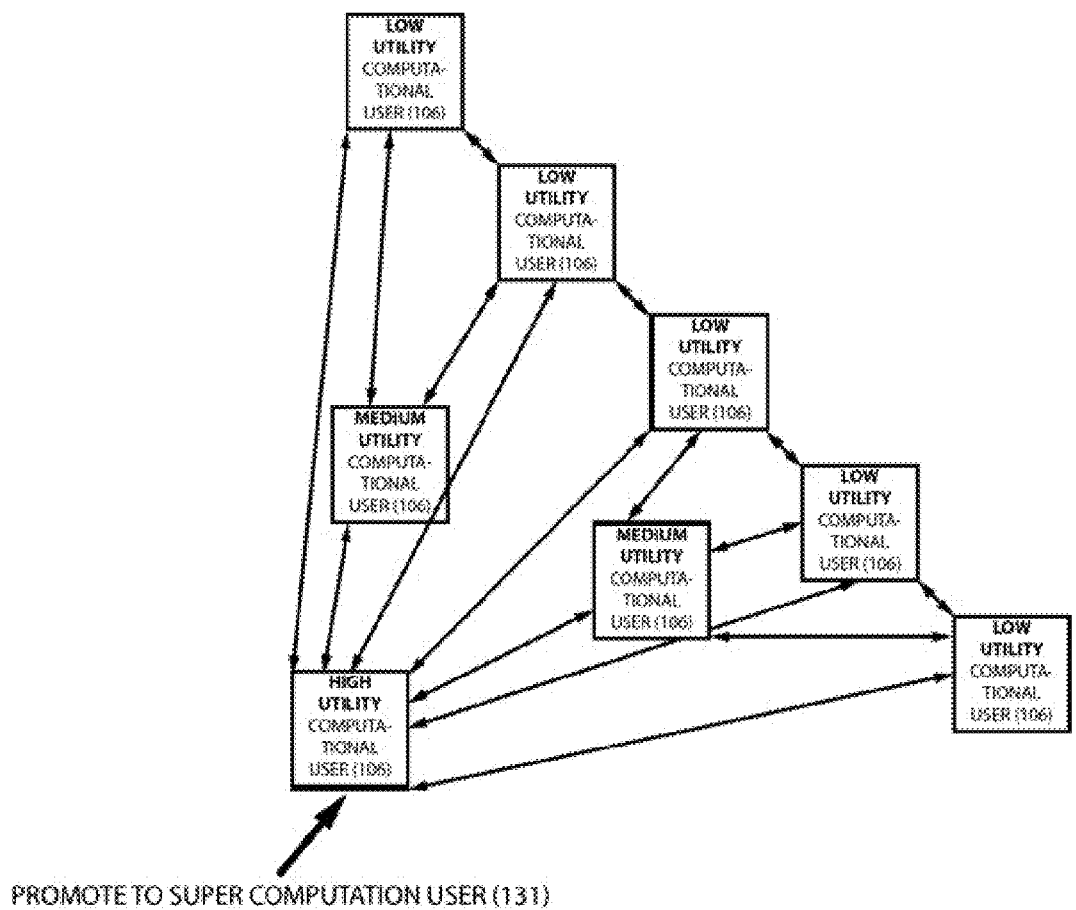
FIG. 8 is an exemplary topology of the P2P network for a massively-scalable distributed cloud computing platform in accordance with some embodiments.

FIG. 7 shows an exemplary diagrammatic representation of a Super Computation User (131) architecture. One configuration of the distributed computing network of the framework starts with a gradient topology, where there is no distinction between Computation Users (106) and Super Computation Users (131). Computation Users (106) have two sets of neighbors: a set of neighbors with similar utility and a set of random neighbors. The Computation User's (106) gossip (i.e., transmit data) to maintain their random and similarity sets. Computation Users (106) with the highest utility are clustered in the center, while peers with decreasing utility are found at an increasing distance from the center of the network grid. An example diagram of this process is depicted in FIG. 8.

Computation Users (106) may be promoted to Super Computation User (131) status when they meet local utility requirements, and the top X percent of Computation Users (106) with the highest utility are promoted, which often requires a global knowledge of the Computation User (106) utility distribution. The criteria for Super Computation User (131) promotion in some embodiments includes, but not limited to, the following characteristics: average, median, and expected session time, bandwidth, latency, open IP address, and/or NAT bound IP address. Using Computation Users (106) utility distribution algorithms, the minimum characteristic is determined for promotion to a Super Computation User (131), which is dynamically updated at runtime using gossiping communication methods. The Super Computation User (131) promotion algorithm makes a local decision about promotion possibly using: measurements of each Computation User's (106) local utility levels of bandwidth, CPU, and memory, a model for Computation Users (106) utility distributions, and tests of the Computation User's (106) local network interfaces for NAT-bound or open IP addresses.

The maximum utility is then able to be estimated, along with the number of Computation Users (106) in the system, and a cumulative histogram of Computation User (106) utility values. Computation Users (106) then use the local cumulative histogram of peer utility values to estimate the utility level for the top X percent of computation users in the system.

Figure 9:
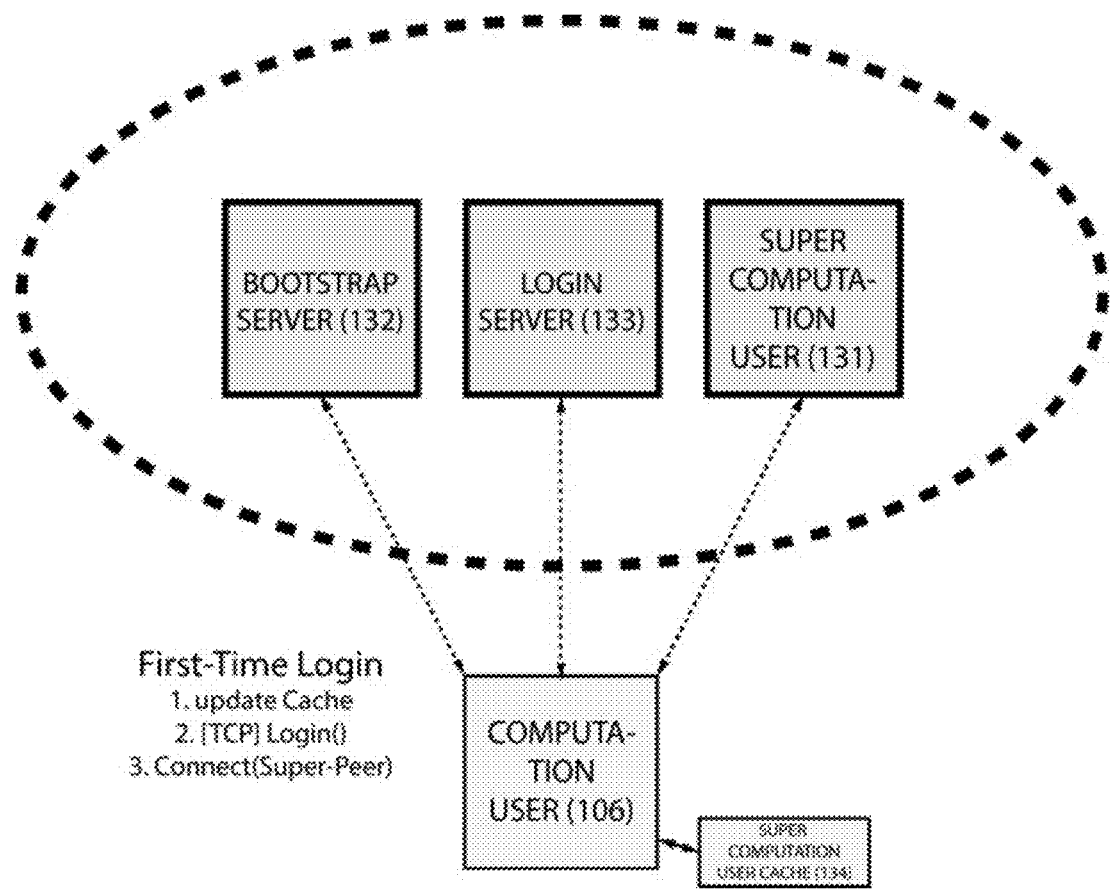
FIG. 9 is an exemplary representation of a computation user in the P2P network for a massively-scalable distributed cloud computing platform in accordance with some embodiments.

FIG. 9 depicts one exemplary representation, showing that when a Computation User (106) first visits the Website (109) connected to the framework, the computer contacts a Bootstrap Server (132) by trying different protocols such as UDP, TCP, HTTP Proxy, and HTTPS Proxy; then fills in a Super Computation User Cache (134) that is stored locally on the Computation User's (106) Web Browser (107). Next, the Computation User (106) is logged into a centralized server using a Login Server (133) and TCP, and an algorithm is run to determine whether or not to promote this peer to a Super Computation Users (131). Super Computation Users (131) manage a global index of Computation Users (106) and hosts, which creates a multi-tiered network where Super Computation Users (131) communicate in such a way that every Computation User (106) in the network has full knowledge of all available Computation Users (106) and resources with minimal latency. Starting at the main application server, a distributed application is then mapped redundantly onto selected Super Computation Users (131), whereby it is again mapped onto selected Computation Users (106). Computational communications are then routed as: Computation User (106) to Computation User (106), Computation User (106) to Super Computation Users (131), Super Computation Users (131) to Computation Users (106), and Super Computation Users (131) to Super Computation Users (131). This may be performed using an available or modified P2P communication system (e.g. WebRTC, RMFTP, Jingle, etc.), a new P2P communication system, or any combination thereof.

Figure 10:
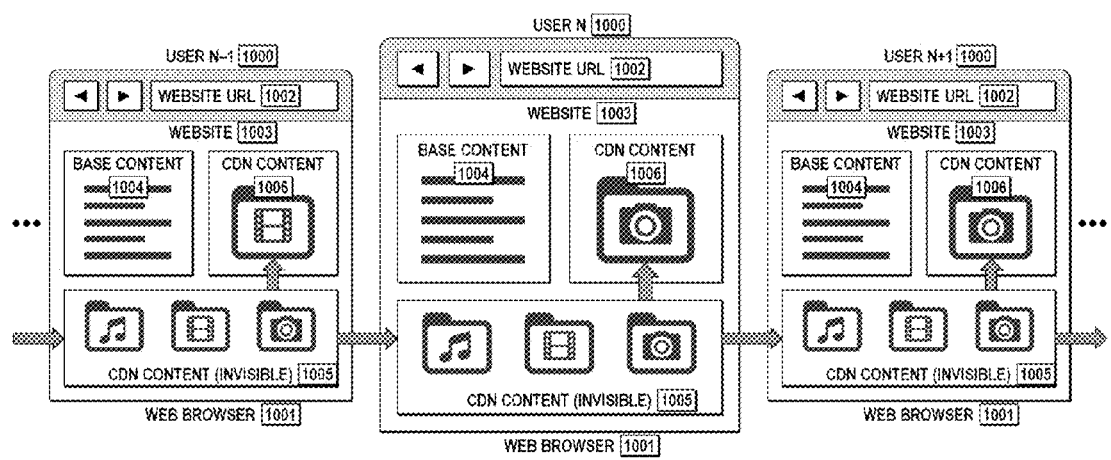
FIG. 10 is an exemplary framework for a content delivery network using distributed website-based technology.

Exemplary Framework Concept: Content Delivery Network (CDN) Using Distributed Website-Based Technology FIG. 10 depicts an exemplary embodiment of content delivery network (CDN) using the above-described distributed processing technology. The figure identifies the following components or elements of the system:

Users (1000) (e.g. User N-1, User N, and User N+1), which are end users, can access the framework on a personal computer (PC), notebook, smartphone, tablet, or any other such device that can support a Web Browser (1001), which gives the Users (1000) access to Websites (1003) that participate in the framework. A Website URL (1002), is a character string that constitutes a reference to the Website (1003) resources. Base Content (1004) are parts of the Website (1003) that get delivered from the web server, and not through the CDN. The Base Content (1004) may comprise anything from text and/or HTML content to image, audio, video, document, data, and/or application content. The Base Content (1004) also supports the facilitation of the CDN Content (Invisible) (1005).

CDN Content (Invisible) (1005), are the elements of the Website (1003) that get delivered through the CDN, and not from the web server. The CDN Content (Invisible) (1005) remains invisible to the Users (1000) until CDN Content (1006) requests it. The CDN Content (Invisible) (1005) may comprise anything from text and/or HTML content to image, audio, video, document, data, and/or application content. CDN Content (1006), which are parts of the Website (1003) that get delivered from the CDN Content (Invisible) (1005), which were obtained through the CDN. The CDN Content (1006) may comprise anything from text and/or HTML content to image, audio, video, document, data, and/or application content. The CDN Content (1006) is visible to the Users (1000).

In FIG. 10, when a User (1000) (e.g. User N) types in the Website URL (1002) of the Website (1003) in the Web Browser (1001), the Base Content (1004) is first loaded, along with the facilitator of the CDN Content (Invisible) (1005). This facilitator obtains the CDN Content (Invisible) (1005) from other Users (1000) (e.g. User N-1). Some or all of the CDN Content (Invisible) (1005) may then be used for CDN Content (1006) on the Website (1003). The User (1000) (e.g. User N) may then share some or all of the CDN Content (Invisible) (1005) with other Users (1000) (e.g. User N+1).

Figure 11:
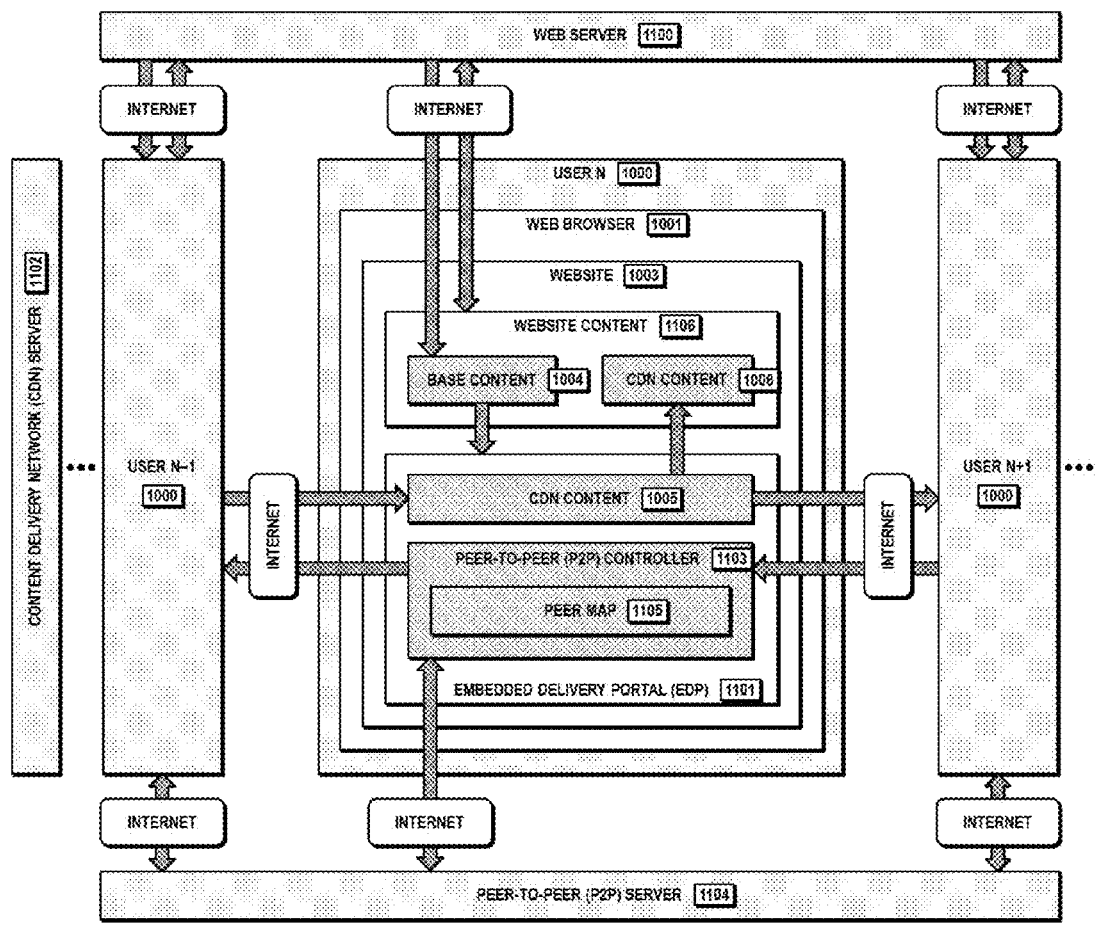
FIG. 11 is an exemplary communication structure according to some embodiments for a content delivery network using distributed website-based technology.

FIG. 11 depicts an example communication structure using the framework. This framework includes the Web Server (1100), which determines which parts of the Website (1003) are to be delivered through the CDN. This distinction may be handled dynamically as well, during the operation of the Website (1003). An Embedded Delivery Portal (EDP) (1101), is the framework execution component that is seamlessly embedded into the website, independent of any Website Content (1106). This way, there is no need for the User (1000) to download and install any applications, use browser plug-ins or extensions, or run native code. As the User (1000) interfaces with the Website Content (1106), the EDP (1101) executes silently and automatically in the background. Using the disclosed techniques, in some examples there is no requirement of the User (1100) to actively engage with the EDP (1101) in any way. A Content Delivery Network (CDN) Server (1102) seeds the CDN Content (1005) for the initial Users (1000). Since subsequent Users (1000) obtain the CDN Content (1005) from other Users (1000), the CDN Server (1102) is naturally lightweight. A Peer-to-Peer (P2P) Controller (1103) orchestrates the P2P paradigm in the CDN and communicates directly with the CDN Server (1102), P2P Server (1104), and other Users (1000).

The Peer-to-Peer (P2P) Server (1104), which is able to determine for each User (1000) from which other Users (1000), it is most suitable to obtain the CDN Content (1005).

The P2P Server (1104) sends each User (1000) a Peer Map (1105), which can be in the form of a priority list of other Users (1000). The Peer Map (1105) is generated from a given set of heuristics, which may include (but is not limited to) distance, latency, bandwidth, and packet loss between the Users (1000), as well as the hardware profiles, spatial and temporal density, and current and past performance of the Users (1000). The Website Content (1106), which includes all the content on the Website (1003), including the Base Content (1004), CDN Content (1005, 106), and the EDP (1101).

The Users (1000) (e.g. User N-1, User N, and User N+1) are end users, which can access the framework on a personal computer (PC), notebook, smartphone, tablet, or any other such device that can support a Web Browser (1001). The Web Browser (1001) gives the Users (1000) access to Websites (1003), some of which may participate in the framework. The owners of each Website (1003), those that have control over the Web Server (1100), can selectively enable any webpages of the Website (1003) to automatically participate in the framework. At the User (1000) side, the framework execution, here shown as EDP (1101), is seamlessly embedded in the website, independent of any Website Content (1106). This way, there is no need for the User (1000) to download and install any applications, use browser plug-ins or extensions, or run native code. As the User (1000) interfaces with the Website Content (1106), the EDP (1101) executes silently and automatically in the background. With the techniques disclosed herein, in some examples there is no requirement of the User (1000) to actively engage with the EDP (1101) in any way.

For different users, both the Base Content (1004) and CDN Content (1005, 106) may comprise anything from text and/or HTML content to image, audio, video, document, data, and/or application content. The goal of the website-based CDN techniques described herein is to increase the performance of the Website (1003) by giving the User (1000) and/or the owner of the Website (1003) a better experience. Just like with any CDN, this may be accomplished by taking some content away from the Web Server (1100) and placing it on the CDN Server (1102). For the User (1000), this translates to decreasing the Base Content (1004) and increasing the CDN Content (1005, 106). The content that is placed into the CDN Content (1005, 106) is done so using predetermined performance metrics that can dynamically allocate the content to achieve the best performance.

Embedded into the Website (1003), the EDP (1101) is responsible for bringing CDN Content (1005, 106) to the User (1000) (User N) from other Users (1000) (User N-1), as well as distributing the CDN Content (1005) to other Users (1000) (User N+1). The orchestration of this P2P paradigm is accomplished using the P2P Controller (1103), with has direct communication with the CDN Server (1102), P2P Server (1104), as well as with other Users (1000). For any User (1000), the P2P Server (1104) is able to determine from which other Users (1000) it is most suitable to obtain the CDN Content (1005). The P2P Server sends each User (1000) a Peer Map (1105), which can be in the form of a priority list of other Users (1000). The Peer Map (1105) is generated from a given set of heuristics, which may include (but is not limited to) distance, latency, bandwidth, and packet loss between the Users (1000), as well as the hardware profiles, spatial and temporal density, and current and past performance of the Users (1000).

Once the Peer Map (1105) is given to the User (1000), the User (1000) is able to connect to the other Users (1000) on the Peer Map (1105) to obtain the CDN Content (1005). The dynamic nature of the P2P paradigm allows the Users (1000) to join and leave the framework as easily as opening up and closing the Website (1003), respectively. Therefore, if a User (1000) (User N) begins to obtain the CDN Content (1005) from another User (1000) (User N-1), and User N-1 leaves the framework in the middle of the process, User N is then able to go through and connect to the next available User (1000) on the Peer Map (1105). This allows for the process to continue seamlessly until all of the CDN Content (1005) is available on User N. Once User N has the CDN Content (1005), the User (1000) then notifies the P2P Server (1104), which is then able to place User N on the Peer Map (1105) of other Users (1000), so other Users (1000) can obtain the CDN Content (1005) from User N. Using this approach, the next user (User N+1) is able to obtain the CDN Content (1005) from User N. For simplicity purposes, this example in FIG. 11 shows the User (1000) connected to one other User (1000) at a time. However, embodiments of the website-based CDN can make it possible to connect to multiple Users (1000) at a time at both sides of the transfer. Using the aforementioned set of heuristics, it is possible to statically or dynamically configure the number of simultaneous User (1000) connections to optimize for the highest performance.

When there are no more other Users (1000) from which to get the CDN Content (1005), a User (1000) who needs the CDN Content (1005, 106) can connect to the CDN Server (1102) to obtain it. This is necessarily going to be the case for the first User (1000) connecting to the framework. It may also be the case that even with the presence of other available Users (1000), a User (1000) who needs the CDN Content (1005, 106) may connect to the CDN Server (1102) if this produces a more favorable performance, based on the aforementioned heuristics. The CDN Server (1102) essentially acts as a seed for one or more Users (1000). In circumstances where there are a lot of simultaneous Users (1000) connecting to the framework, the reliance on the CDN Server (1102) decreases, since there are more opportunities for Users (1000) to connect to other Users (1000) with more favorable performance. In circumstances where the number of simultaneous Users (1000) is scarce, the reliance on the CDN Server (1102) increases, since there may be more occurrences of the CDN Server (1102) reseeding the CDN Content (1005) to Users (1000).

To elucidate FIG. 11 further, an exemplary method includes the following steps. The owner of the Website (1003) with control over of the Web Server (1100) decides which parts of the Website (1003) are Base Content (1004) and which are CDN Content (1005, 106). This distinction may be handled dynamically as well, during the operation of the Website (1003). The Base Content (1004), which also includes the EDP (1101), is stored in and is handled by the Web Server (1100). The CDN Content (1005, 106) is stored in and is handled by the CDN Server (1102), which acts as the seed in the P2P paradigm. When a User (1000) (User N) opens up the Website (1003) on the Web Browser (1001), the Base Content (1004) of the Website Content (1106) is initially transferred from the Web Server (1100). The Base Content (1004) also includes the EDP (1101), which will be able to connect to the CDN Server (1102), P2P Server (1104), and other Users (1000).

The P2P Controller (1103) of the EDP (1101) connects to the P2P Server (1104), which generates and sends a Peer Map (1105) to the User (1000). The User (1000) then connects to an available other User (1000) (User N-1) on the Peer Map (1105), and begins transferring CDN Content (1005) from User N-1 to User N. If User N-1 disconnects from the framework before User N completes the transfer, User N then connects to the next available other User (1000) on the Peer Map (1105). If there are no more available other Users (1000) for which User N can connect, User N connects directly to the CDN Server (1102), and begins transferring CDN Content (1005) from the CDN Server (1102) to User N. As soon as User N obtains the CDN Content (1005), the EDP (1101) of the User (1000) disconnects from other Users (1000) or the CDN Server (1102), and transfers a copy of the CDN Content (1005, 106) to the Website Content (1106). The P2P Controller (1103) of User N then repeatedly pings the P2P Server (1104) with short packets to notify it of its CDN Content (1005) resource availability. During that period, the P2P Server (1104) may now direct other Users (1000) (User N+1) to connect to User N, to transfer the CDN Content (1005) from User to User+1. This process continues until User N disconnects from the framework.

Figure 12:
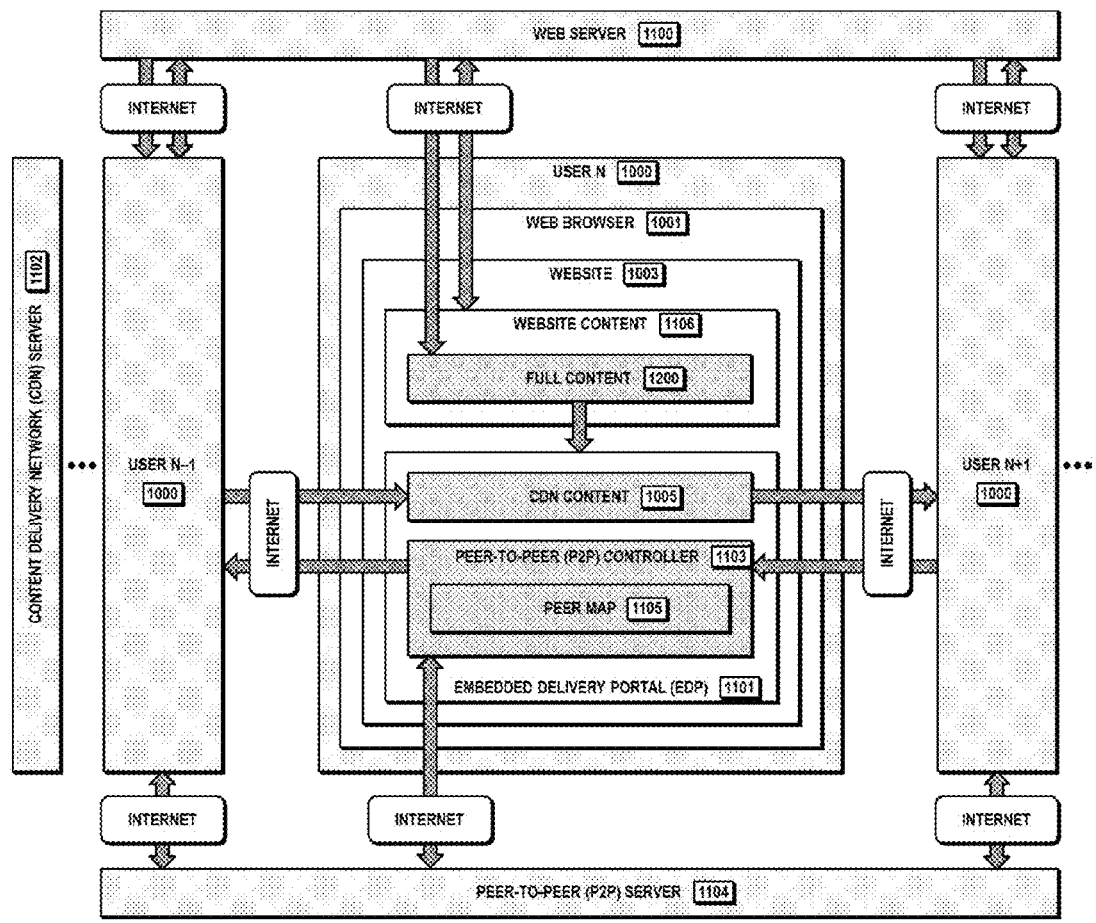
FIG. 12 is an exemplary communication structure according to some embodiments for a content delivery network using distributed website-based technology.

One possible variation of the website-based CDN techniques is depicted in FIG. 12. Here, the Website Content (1106) consists entirely of the Full Content (1200), which gets delivered from the Web Server (1100), and not through the CDN. The Full Content (1200) also includes the EDP (1101), which is also delivered from the Web Server (1100). This variation can be useful for a scenario where the owner of the Website (1003) wishes for the Users (1000) of the Website (1003) to participate in the CDN, but does not wish to use the CDN Content (1005) in the Website Content (1106).

With this variation, an example sequence may include the following steps. The owner of the Website (1000) with control over of the Web Server (1100) supplements the Full Content (1200) of the Website (1003) with the EDP (1101). The Full Content (1200), which also includes the EDP (1101), is stored in and is handled by the Web Server (1100). When a User (1000) (User N) opens up the Website (1003) on the Web Browser (1001), the Full Content (1200) of the Website Content (1106) is initially transferred from the Web Server (1100). The Full Content (1200) also includes the EDP (1101), which will be able to connect to the CDN Server (1102), P2P Server (1104), and other Users (1000). The P2P Controller (1103) of the EDP (1101) connects to the P2P Server (1104), which generates and sends a Peer Map (1105) to the User (1000). The User (1000) then connects to an available other User (1000) (User N-1) on the Peer Map (1105), and begins transferring CDN Content (1005) from User N-1 to User N. If User N-1 disconnects from the framework before User N completes the transfer, User N then connects to the next available other User (1000) on the Peer Map (1105). If there are no more available other Users (1000) for which User N can connect, User N connects directly to the CDN Server (1102), and begins transferring CDN Content (1005) from the CDN Server (1102) to User N. As soon as User N obtains the CDN Content (1005), the EDP (1101) of the User (1000) disconnects from other Users (1000) or the CDN Server (1102). The P2P Controller (1103) of User N then repeatedly pings the P2P Server (1104) with short packets to notify it of its CDN Content (1005) resource availability. During that period, the P2P Server (1104) may now direct other Users (1000) (User N+1) to connect to User N, to transfer the CDN Content (1005) from User to User+1. This process continues until User N disconnects from the framework.

Based on typical requirements of the Website (1003) owner, it is also possible to implement a hybrid operation of the Users (1000) depicted in both FIG. 11 and FIG. 12.

Figure 13:
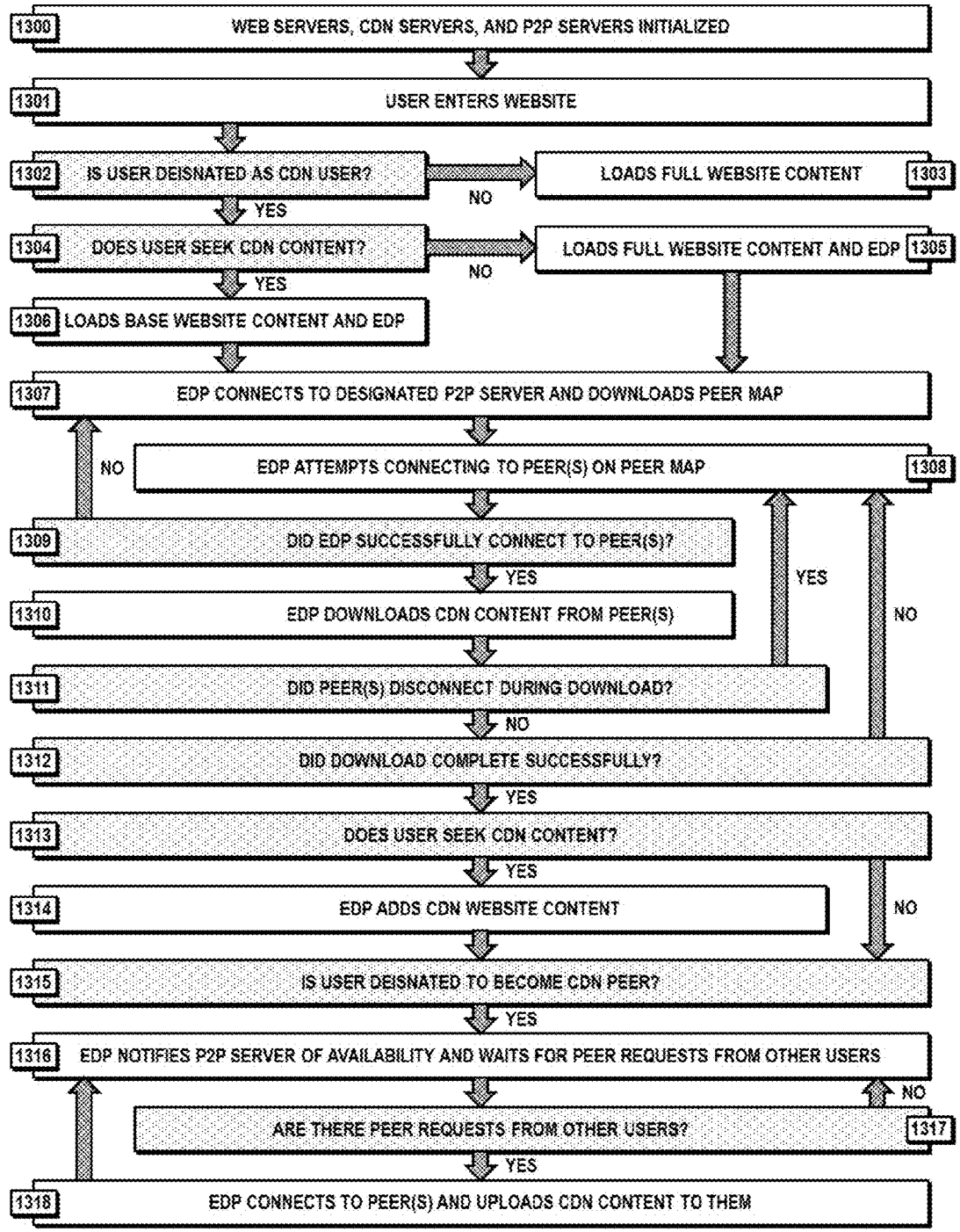
FIG. 13 is an exemplary computerized method for a content delivery network using distributed website-based technology.

An exemplary sequence flowchart of the framework is depicted in FIG. 13. The process include the following steps. The Web Servers, CDN Servers, and P2P Servers are initialized (1300), which is the starting point for the framework. In this step, the Web Servers (1100), CDN Servers (1102), and the P2P Servers (1104) are all initialized, waiting for a User (1000) to enter the Website (1003). The User (1000) then enters the Website (1301).

A determination is made as to whether a User us designated as a CDN User (1302), which is the first inquiry step after the User enters the Website. This designation, which determines whether the User (1000) will participate in the CDN paradigm, may occur at the Web Server (1100). The Website (1003) owner may designate Users (1000) to participate in the CDN paradigm using (but not limited to) heuristic, statistical, and/or random distribution assignments, or any combination thereof. The full website is loaded Content (1303) if the User (1000) is not designated to participate in the CDN paradigm by the Web Server (1100). An inquiry is then made to determine if the User is requesting CDN Content (1304), which is the next inquiry step when the User (1000) is designated to participate in the CDN paradigm by the Web Server (1100). When the User (1000) is not designated to seek CDN Content (1006) by the Web Server (1100) but is still designated to participate in the CDN paradigm by the Web Server (1100), the User (1000) loads the Full Content (1200) and the EDP (1101) of the Website (1003) (1305). This allows the User (1000) to seek and receive CDN Content (1005), and share it with other Users (1000).

When the User (1000) is designated to seek CDN Content (1006) by the Web Server (1100) and is also designated to participate in the CDN paradigm by the Web Server (1100), the User (1000) loads the Base Content (1004) and the EDP (1101) of the Website (1003) (1306). This allows the User (1000) to seek CDN Content (1005, 106), and share it with other Users (1000).

EDP Connects to Designated P2P Server and Downloads Peer Map (1307), which is an action step following the User (1000) loading the EDP (1101) of the Website (1003). In this step, the EDP (1101) connects to the P2P Server (1104) and downloads a Peer Map (1105) for the User (1000). Next, the EDP (1101) attempts to connect the User (1000) to other Users (1000) instantiated on the Peer Map (1308). A determination is made as to whether the connection is successful (1309). This step inquires whether the EDP (1101) successfully connected the User (1000) to other Users (1000) instantiated on the Peer Map (1308). If the connection was not successful, the sequence flowchart points back to the EDP Connects to Designated P2P Server and Downloads Peer Map (1307) step. After successfully connecting the User (1000) to other Users (1000) instantiated on the Peer Map (1308), the EDP downloads CDN content from the peer(s) (1310) from other Users (1000). An inquiry is then made to determine if any peer(s) disconnected during download (1311). If this is affirmative, the sequence flowchart points back to the EDP Downloads CDN Content from Peer(s) (1310) step. If other Users (1000) did not disconnect from the User (1000) during the download of the CDN Content (1005), a check is made to determine if the download completed successfully (1312). If this is not affirmative, the sequence flowchart points back to the EDP Downloads CDN Content from Peer(s) (1310) step.

If the download of the CDN Content (1005) was successfully completed an inquiry is made to determine if the User wishes to receive CDN Content? (1313) by the Web Server (1100). If this is not affirmative, the sequence flowchart points to the Is User Designated to Become CDN Peer? (1315) step. The EDP then adds CDN Website Content (1314) if the User (1000) is designated to seek CDN Content (1006) by the Web Server (1100). The next step (1315) inquires whether the User (1000) is designated to share the CDN content (1005) with other Users (1000). This designation may occur at the Web Server (1100), CDN Server (1102), and/or the P2P Server (1104), or any combination thereof. If this is not affirmative, the sequence flowchart stops at this step. Next, if the User (1000) is designated to share the CDN Content (1005) with other Users (1000), the EDP (1101) notifies the P2P Server (1104) of the availability of its CDN Content (1005), and waits for other Users (1000) to connect to the User (1000) (1316). If there are no peer requests from other users (1317), the sequence flowchart points to step 1316, otherwise the EDP connects to peer(s) and uploads CDN content (1318). The sequence then reverts back to step 1316.

Using this framework, there are several different operational models that can be applied, including (but not limited to):

1. Operational Model 1, where a single entity (Entity 1) owns and operates the Website (1003), Web Server (1100), CDN Server (1102), and the P2P Server (1104), and uses the CDN for its own purposes. This is useful for entities like Entity 1 that receive a lot of website traffic, have content that benefits from the CDN, and have the resources for the servers to support the framework.
2. Operational Model 2, where a single entity (Entity 1) owns and operates the Website (1003), Web Server (1100), CDN Server (1102), and the P2P Server (1104), and does not use the CDN for its own purposes. Entity 1 is then able to support the CDN for a different entity (Entity 2). This is useful for entities like Entity 1 that receive a lot of website traffic, do not have content that benefits from the CDN, but have the resources for the servers to support the framework. Entity 2 is then able to reward Entity 1 for the services, financially or otherwise.
3. Operational Model 3, where a single entity (Entity 1) owns and operates the Website (1003) and Web Server (1100), and uses the CDN for its own purposes. The second entity (Entity 2) owns and operates the CDN Server (1102) and the P2P Server (1104). This is useful for entities like Entity 1 that receive a lot of website traffic, have content that benefits from the CDN, but do not have the resources for the servers to support the framework. Entity 1 is then able to reward Entity 2 for the services, financially or otherwise.
4. Operational Model 4, where a single entity (Entity 1) owns and operates the Website (1003) and Web Server (1100), and does not use the CDN for its own purposes. The second entity (Entity 2) owns and operates the CDN Server (1102) and the P2P Server (1104). Entity 1 is then able to support the CDN for a different entity (Entity 3). This is useful for entities like Entity 1 that receive a lot of website traffic, do not have content that benefits from the CDN, and do not have the resources for the servers to support the framework. Entity 3 is then able to reward Entity 1 for the services, and Entity 1 is then able to reward Entity 2 for the services, financially or otherwise.

Figure 14:
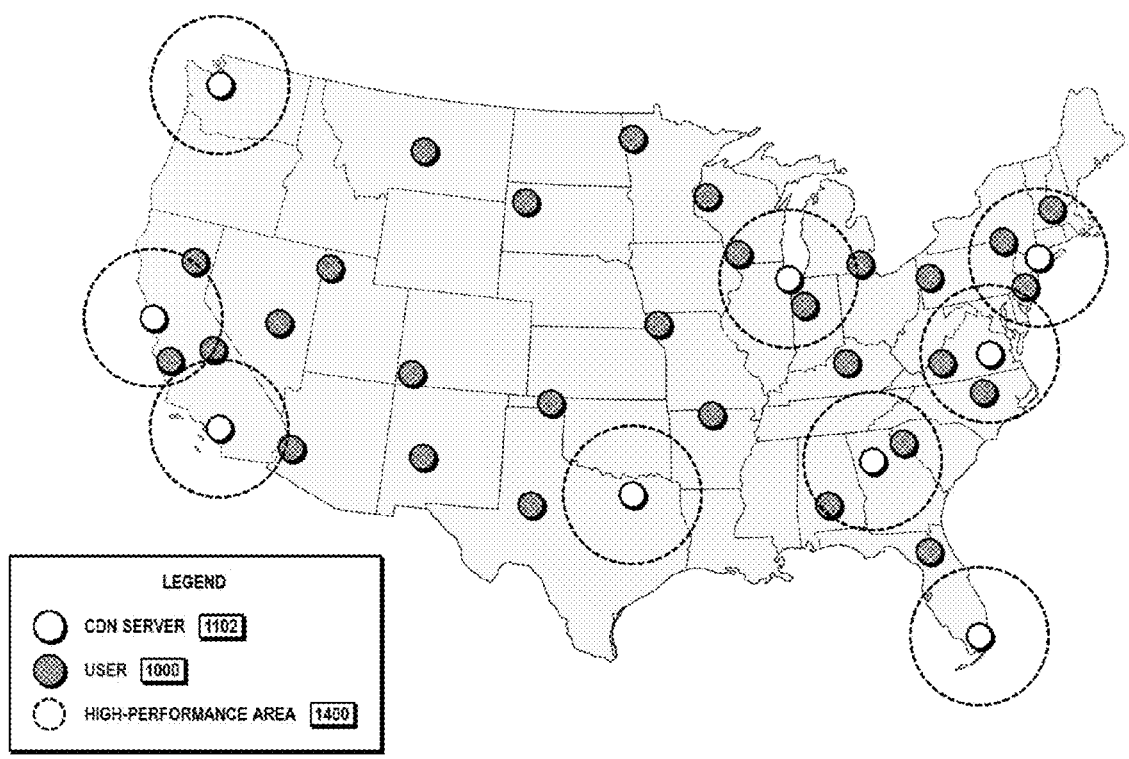
FIG. 14 is an exemplary diagram of a geographic configuration of a CDN paradigm according to some embodiments overlaid on top of a map of the United States for a content delivery network using distributed website-based technology.

FIG. 14 depicts an example geographic configuration of a traditional CDN paradigm, overlaid on top of a map of the United States. For the following examples, the specific maps are just for illustrative purposes—these ideas extend to almost all geographic configurations, covering any parts of the world. The traditional CDN comprises three major components.

CDN Servers (1102) are servers that deliver CDN Content (1005, 106) to the Users (1000). These servers, owned by the CDN service providing companies, are typically at the edge of the network, close to the Users (1000), to optimize performance and cost. In this example, the CDN Servers (1102) are distributed across major American cities of Atlanta, Chicago, Dallas, Los Angeles, Miami, New York, Richmond, San Francisco, and Seattle. The geographic layout of these CDN Servers (1102) aims to maximize the CDN performance for the entire region (in this example, the United States). Even though a larger deployment of these servers may be preferable, the number of these servers is generally limited by cost and complexity. Many CDN service providing companies further rely on peering with internet service provider (ISP) companies to increase the redundancy, burstability, and overall performance of the CDN.

Users (1000) refer to end users, who may require access to the CDN Content (1005, 106) through a personal computer (PC), notebook, smartphone, tablet, or any other such device. The configuration of FIG. 14 represents a random subset of these Users (1000) that may require access to the CDN Content (1005, 106) at one point in time. The exact User (1000) spread typically depends on many factors, including temporal and geographic locality, arising from temporal and geographic popularity, as well as internet access availability, hotspots, and performance.

High-Performance Areas (1400) are areas inside which the performance of the CDN Server (1102) for Users (1000) is superior. This is determined by (but is not limited to) distance, latency, bandwidth, and packet loss between the CDN Servers (1102) and the Users (1000), as well as the hardware profiles, spatial and temporal density, and current and past performance of the CDN Servers (1102) and the Users (1000). For example, the High-Performance Area (1400) could define the region where any User (1000) seeking CDN Content (1005, 106) within its bounds can have access to the CDN Content (1005, 106) in less than 5 milliseconds. For illustrative purposes, these High-Performance Areas (1400) in FIG. 14 are depicted as circles, but these actual areas can each take any shape around the CDN Servers (1102), depending on the aforementioned example metrics.

Therefore, in FIG. 14, when Users (1000) seek CDN Content (1005, 106) from the CDN, the ones that are within the High-Performance Area (1400) of any CDN Server (1102) are able to get the CDN Content (1005, 106) within 5 milliseconds, in this example. The Users (1000) outside of the High-Performance Areas (1400) therefore naturally obtain the CDN Content (1005, 106) with a relatively lower performance. This is why it is more advantageous to distribute more CDN Servers (1102) in the area, or employ more peering with ISP companies, ideally covering the entire map with High-Performance Areas (1400). The limitations for this expansion are cost and complexity.

Figure 15:
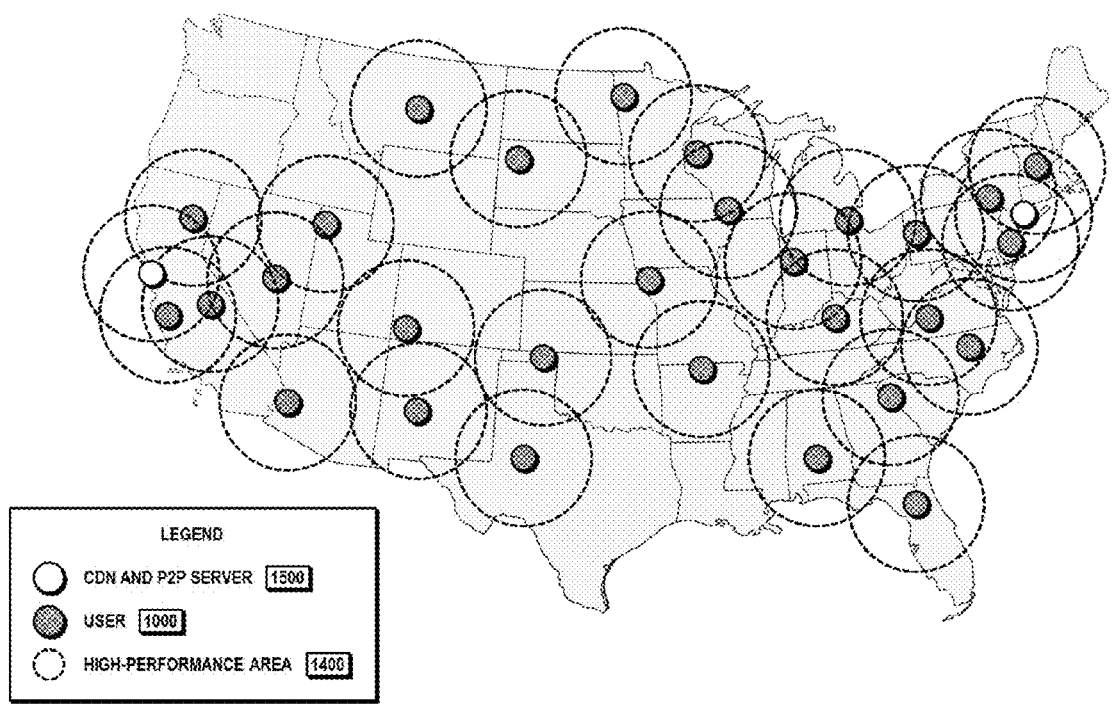
FIG. 15 is an exemplary diagram of a geographic configuration of a CDN paradigm according to some embodiments overlaid on top of a map of the United States for a content delivery network using distributed website-based technology.

FIG. 15 depicts an example geographic configuration of a website-based CDN paradigm, overlaid on top of a map of the United States. This CDN comprises three major components.

CDN and P2P Servers (1500) are servers that deliver CDN Content (1005, 106) to the Users (1000). In this example, there are now only two CDN and P2P Servers (1500) for the same geography, one in New York and one in San Francisco. The geographic layout of these CDN and P2P Servers (1500) aims to maximize the CDN performance for the entire region (in this example, the United States). Here, a larger deployment of these servers is not required, since each User (1000) is in this paradigm is a potential temporary CDN Server (1102). Also in this example, the P2P Servers (1104) are at the same location as the CDN Servers (1102), although this is not a necessity in the paradigm. Furthermore, the Web Servers (1100) in this example are not depicted in FIG. 15 for simplicity. The Web Servers (1100) may either be located with the CDN and P2P Servers (1500), or be in separate locations.

Users (1000) are end users, who may require access to the CDN Content (1005, 106) through a personal computer (PC), notebook, smartphone, tablet, or any other such device. Here, the Users (1000) are also part of the CDN framework, and can become the source of the CDN Content (1005, 106) for other Users (1000). The configuration of FIG. 15 represents a random subset of these Users (1000) that may require access to the CDN Content (1005, 106) at one point in time. The exact User (1000) spread typically depends on many factors, including temporal and geographic locality, arising from temporal and geographic popularity, as well as internet access availability, hotspots, and performance.

High-Performance Areas (1400) are areas inside which the performance of the CDN and P2P Server (1500) for Users (1000) is superior, or the performance of Users (1000) for other Users (1000) is superior. This is determined by (but is not limited to) distance, latency, bandwidth, and packet loss, as well as the hardware profiles, spatial and temporal density, and current and past performance of the CDN and P2P Servers (1500) and the Users (1000). As in the previous example, the High-Performance Area (1400) could define the region where any User (1000) seeking CDN Content (1005, 106) within its bounds can have access to the CDN Content (1005, 106) in less than 5 milliseconds. Again, for illustrative purposes, these High-Performance Areas (1400) in FIG. 15 are depicted as circles, but these actual areas can each take any shape around the CDN and P2P Servers (1500) and Users (1000), depending on the aforementioned example metrics.

Therefore, in FIG. 15, when Users (1000) seek CDN Content (1005, 106) from the CDN, the ones that are within the High-Performance Area (1400) of any CDN and P2P Server (1500) or other Users (1000) are able to get the CDN Content (1005, 106) within 5 milliseconds, in this example. The Users (1000) outside of the High-Performance Areas (1400) therefore naturally obtain the CDN Content (1005, 106) with a relatively lower performance. Using this paradigm in FIG. 15, most Users (1000) are now within the high-performance area of either the CDN and P2P Servers (1500) or other Users (1000). When a new User (1000) enters and seeks CDN Content (1005, 106) in the example in FIG. 15, this User (1000) is most likely now going to be within at least one High-Performance Area (1400).

Figure 16:
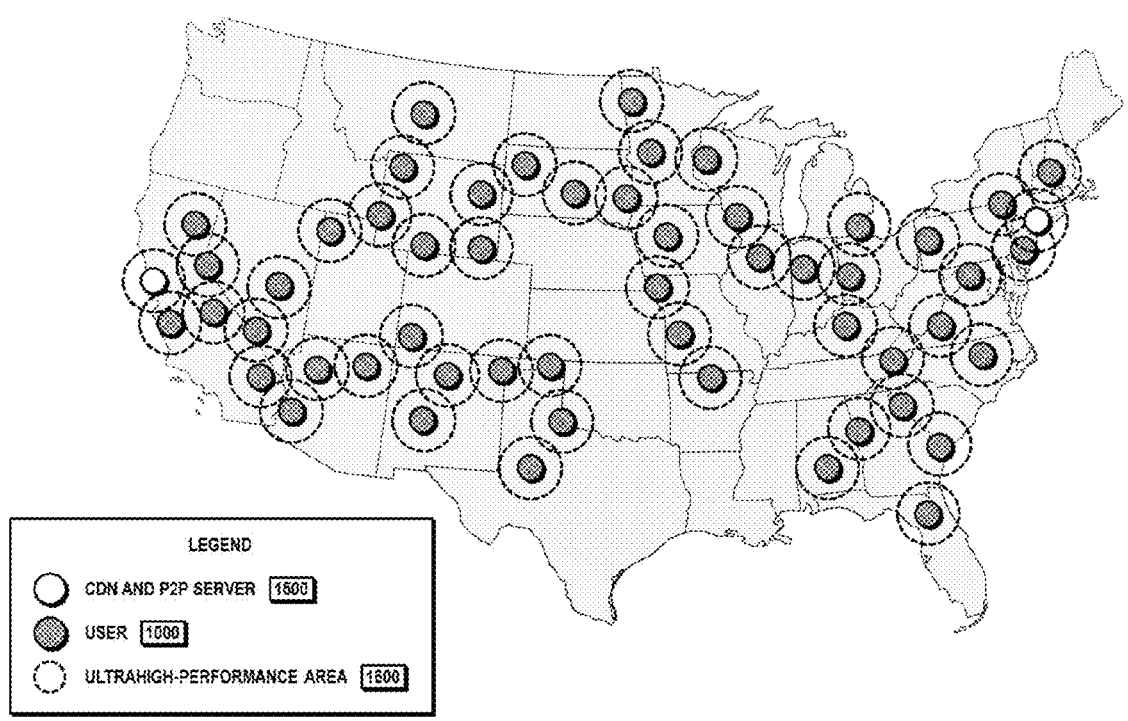
FIG. 16 is an exemplary diagram of a performance increase of the CDN as users increase for a content delivery network using distributed website-based technology.

As more and more Users (1000) begin to enter the framework and become sources of CDN Content (1005, 106), the performance of the CDN actually increases. This is illustrated in FIG. 16, where there are more Users (1000) who have entered the framework relative to the example in FIG. 15. In this example, the geographic density of the Users (1000) is so large that each User (1000) that seeks CDN Content (1005, 106) has a greater chance to be in the vicinity of the Ultrahigh-Performance Area (1600) of other Users (1000), where the CDN performance is superior to even the High-Performance Area (1400). The Ultrahigh-Performance Area (1600) may define the region where any User (1000) seeking CDN Content (1005, 106) within its bounds can have access to the CDN Content (1005, 106) in less than 2 milliseconds, for example. Also, the Ultrahigh-Performance Area (1600) can take any shape around the CDN and P2P Servers (1500) and the Users (1000).

Figure 17:
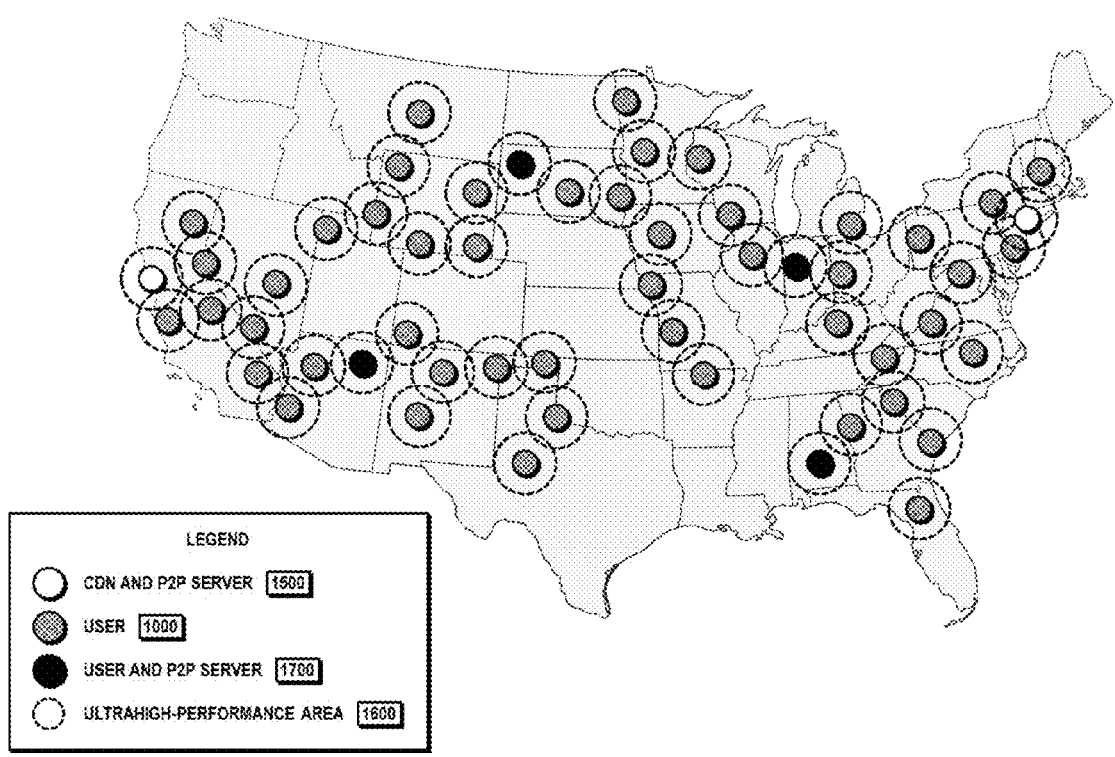
FIG. 17 is an exemplary diagram illustrating distribution among some or all of the users for a content delivery network using distributed website-based technology.

Furthermore, as more and more Users (1000) are in the framework, the responsibility of the P2P Servers (1104) may be also distributed among some or all of the Users (1000). This is illustrated in FIG. 17. In this example, the configuration is similar to the one described for FIG. 16, except here some of the Users are now Users and P2P Servers (1700). Users that take on this status do so because of their geographic and performance characteristics, as well as their duration of the website visit. Since it is more preferable to keep the Users and P2P Servers (1700) configuration static over time to amortize the setup overhead, Users (1000) with a longer duration history on the Website (1003) will have a higher likelihood of becoming Users and P2P Servers (1700). Once a User (1000) becomes a User and P2P Server (1700), it can act as a temporary P2P Server (1104) for other Users (1000). Other Users (1000) with who have geographic and performance advantages of communicating with a User and P2P Server (1700) instead of a CDN and P2P Server (1500) will do so until the User and P2P Server (1700) leave the framework. At this point, the other Users (1000) will either switch to another User and P2P Server (1700), or back to the CDN and P2P Server (1500).

Figure 18:
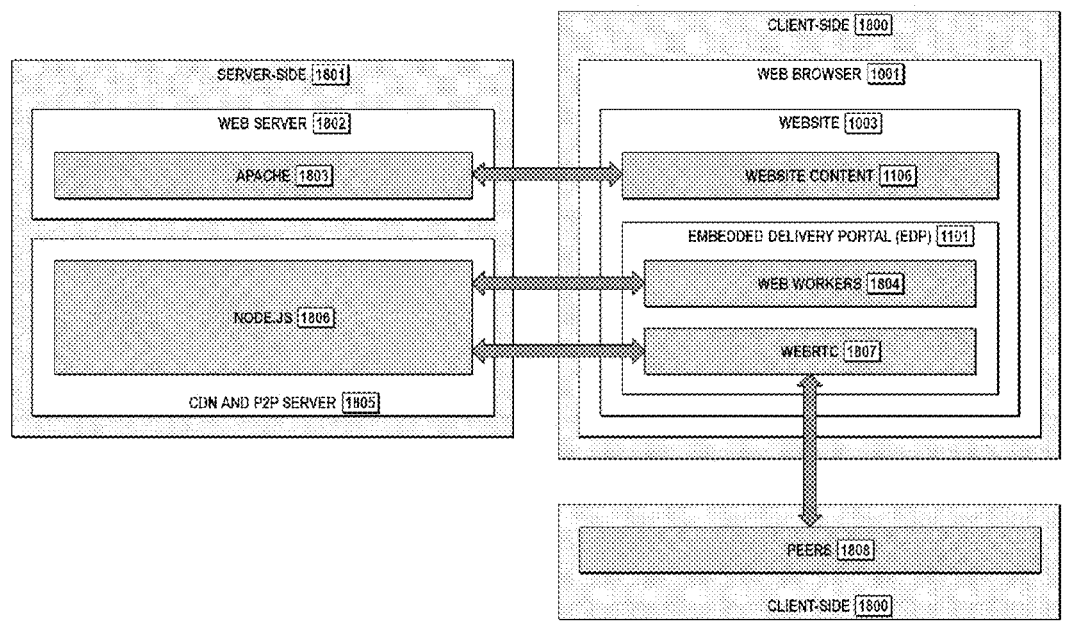
FIG. 18 is an exemplary diagram showing the technology for implementing a content delivery network using distributed website-based technology.

FIG. 18 illustrates the supporting technology interaction. On the Client-Side (1800), the Website (1003) consists of the Website Content (1106) and the EDP (1101). The EDP (1101) includes Web Workers (1804) and WebRTC (1807). The Server-Side (1801) consists of the Web Server (1802) and the CDN and P2P Server (1805). The Web Server (1802) utilizes Apache (1803). The CDN and P2P Server (1805) utilize Node.js (1806). Apache (1803) communicates with the Website Content (1106), while Node.js (1806) communicates with the Web Workers (1804) and the WebRTC (1807). Furthermore, WebRTC (1807) is also able to communicate with other Peers (1808) through the Client-Side (1800) Websites (1003), directed by Node.js (1806) part of the CDN and P2P Server (1805).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method for providing distributed computational resources to a plurality of remotely located users, the method comprising:
receiving, from a host user, an indication that a portion of a website operated by the host user is available for providing access to a plurality of remote computational users to perform one or more remote processing tasks on behalf of others;
receiving, from a task user, a request to have one or more application computations performed using the distributed computational resources, wherein one or more of the application computations include dependencies to another application computation;
providing a computation manager software component to the host user for transmission to the one or more computation users of the website operated by the host user, wherein the computation manager software includes one or more of the application computations and is stored within physical memory at each computation user and executed within a web browser application;
transmitting the computation manager software to the one or more computation users for execution by a processor, wherein the transmission of the computation manager software to the computation users occurs simultaneously with transmission of website content, for use on the website, from the website operated by the host user;
facilitating sharing of results of the execution of the application computations among computation users, wherein the sharing is performed using one or more peer-to-peer connections; and
returning the results of the execution of the application computations to the task user.

2. The method of claim 1 wherein the transmission of the computation manager software to the computation users occurs automatically and without notice to the computation users upon navigating to the website operated by the host user.

3. The method of claim 1 wherein the task user provides the request via a computation interface which translates the requested application computations into computation task segments and computation memory segments.

4. The method of claim 1 wherein the host user notifies each computation user of the presence of the computation manager software prior to execution of the application computations.

5. The method of claim 1 further comprising compensating the host user for use of the website and therefore access to the computation users.

6. The method of claim 5 wherein compensation may comprise financial compensation.

7. The method of claim 1 wherein the computation users comprise users operating heterogeneous browser applications.

8. The method of claim 1 wherein the application computations comprise identifying and downloading content requested by the task user from a content server to the task user.

9. The method of claim 1 further comprising promoting one or more computation users to super computation users based on one or more utility measures of the computation users.

10. The method of claim 9 wherein the utility measures comprise one or more of average session time, median session time, expected session time, bandwidth, latency, open IP addresses, and NAT bound IP address.

11. The method of claim 1 further comprising providing a cloud-based service manager application, wherein the cloud-based service manager application manages allocation of application computations among the computation users.

12. A computerized system for providing distributed computational resources to a plurality of remotely located users, the system comprising:
  at least one memory storing computer-executable instructions; and
  at least one processing unit for executing the instructions stored in the memory, wherein execution of the instructions results in one or more application modules together comprising:
    an interface module for facilitating the submission of requests to have one or more application computations performed using the distributed computational resources;
    a data manager module for storing:
      (i) identities of host users and respective websites offered by host users for providing access to computation users;
      (ii) identities of task users requesting execution of application computation requests; and
      (iii) results of the application computation requests once executed by computation users; and
    a computation manager software component for transmission to the one or more computation users of the websites operated by the host user, wherein the computation manager software includes one or more of the application computations and is stored within physical memory at each computation user and executed within a web browser application, and the transmission of the computation manager software to the computation users occurs simultaneously with transmission of website content, for use on the website, from the website operated by the host user;
    a peer-to-peer server for facilitating sharing of application computations among computation users; and
    a cloud manager module for (i) managing allocation and tracking progress of application computations among the computation users, (ii) tracking dependencies among application computations, and (iii) facilitating sharing of results of the execution of the application computations among computation users.

13. The system of claim 12 wherein the transmission of the computation manager software to the computation users occurs automatically and without notice to the computation users upon navigating to the website operated by the host user.

14. The system of claim 12 wherein the interface module translates the requested application computations into computation task segments and computation memory segments.

15. The system of claim 12 wherein the host user notifies each computation user of the presence of the computation manager software prior to execution of the application computations.

16. The system of claim 12 wherein the computation users comprise users operating heterogeneous browser applications.

17. The system of claim 12 wherein the application computations comprise identifying and downloading content requested by the task user from a content server to the task user.

18. The system of claim 12 wherein the cloud manager module further identifies one or more computation users as super computation users based on one or more utility measures of the computation users.

19. The system of claim 18 wherein the utility measures comprise one or more of average session time, median session time, expected session time, bandwidth, latency, open IP addresses, and NAT bound IP address.

* * * * *